(12) United States Patent
Chen et al.

(10) Patent No.: US 7,634,541 B2
(45) Date of Patent: Dec. 15, 2009

(54) AUTOMATIC DISTRIBUTION OF ELECTRONIC DOCUMENTS INTO AND FROM A PRINTING APPARATUS MAILBOX

(75) Inventors: Paul Chen, Huntington Beach, CA (US); James Justin Depoy, Corona del Mar, CA (US)

(73) Assignee: Canon Development Americas Inc., Irvine, CA (US)

( * ) Notice: Subject to any disclaimer, the term of this patent is extended or adjusted under 35 U.S.C. 154(b) by 546 days.

(21) Appl. No.: 10/413,277

(22) Filed: Apr. 14, 2003

(65) Prior Publication Data

US 2004/0205137 A1    Oct. 14, 2004

(51) Int. Cl.
   *G06F 15/16*    (2006.01)
(52) U.S. Cl. .................. 709/206; 709/203; 709/219; 709/223; 725/46; 725/53; 725/63; 358/1.15; 358/14
(58) Field of Classification Search ................ 709/206, 709/215, 245, 203, 219, 230, 231; 725/46, 725/53, 63; 386/54, 73; 358/1.15, 402
   See application file for complete search history.

(56) References Cited

U.S. PATENT DOCUMENTS

| | | | |
|---|---|---|---|
| 5,968,117 A | 10/1999 | Schuetze | |
| 5,982,507 A | 11/1999 | Weiser et al. | |
| 6,025,931 A | 2/2000 | Bloomfield | |
| 6,175,858 B1 | 1/2001 | Bulfer et al. | |
| 6,374,246 B1 | 4/2002 | Matsuo | |
| 6,396,513 B1 | 5/2002 | Helfmen et al. | |
| 2001/0029531 A1* | 10/2001 | Ohta | 709/223 |
| 2002/0191211 A1* | 12/2002 | Miller et al. | 358/1.15 |
| 2002/0194307 A1* | 12/2002 | Anderson et al. | 709/219 |
| 2003/0016393 A1* | 1/2003 | Johnson et al. | 358/402 |
| 2003/0063309 A1* | 4/2003 | Parry | 358/1.15 |
| 2003/0163515 A1* | 8/2003 | Loveland et al. | 709/203 |
| 2003/0187951 A1* | 10/2003 | Shen | 709/219 |
| 2003/0208544 A1* | 11/2003 | Wilson | 709/206 |

\* cited by examiner

*Primary Examiner*—Saleh Najjar
*Assistant Examiner*—Thuong T Nguyen
(74) *Attorney, Agent, or Firm*—Canon U.S.A., Inc., IP Division

(57) ABSTRACT

A method and system for distributing electronic documents to at least one storage location of an electronic document transfer application and to at least one electronic mailbox residing on at least one printing apparatus. The method and system comprising executing a client application that transmits the electronic documents, executing a client application that receives the electronic documents, wherein the server application associates the at least one storage location of the electronic document transfer application to the at least one electronic mailbox residing on at least one printing apparatus, wherein the server application transmits the electronic documents to the at least one electronic mailbox residing on at least one printing apparatus per the association, wherein the electronic addresses corresponding to the at least one storage location of the electronic document transfer application are the same as the electronic addresses corresponding to the at least one electronic mailbox residing on the at least one printing apparatus.

27 Claims, 20 Drawing Sheets

AUTOMATIC DISTRIBUTION OF ELECTRONIC DOCUMENTS INTO AND FROM A PRINTING APPARATUS MAILBOX

BACKGROUND OF THE INVENTION

1. Field of the Invention

The present invention relates to a computer system, and deals more specifically with a method and system for distributing electronic documents into and from a printing apparatus' electronic mailbox.

2. Description of the Related Art

In today's office environment a need exists to transfer files and documents from one individual to another individual or to multiple individuals. One of the most popular and easiest methods of transferring documents is via electronic mail (e-mail). In this scenario, the individual sends an electronic copy of the document by attaching it as a file to an e-mail message and then sending the message to the recipient(s) e-mail address. In general, an e-mail address is comprised of a user's identification and an e-mail server identification. For example, in the e-mail address johndoe@email.com. "johndoe" identifies the recipient or user and "email.com" identifies the e-mail server. When the e-mail arrives at the e-mail server, the e-mail message along with the attached electronic copy of the document are stored in a electronic virtual mailbox of the e-mail application, where the mailbox is identified by the user's identification part of the e-mail address. The electronic virtual mailbox is typically either a memory location or a disk storage area on the server. Other methods of transferring files and documents include using a file transfer protocol (FTP) application and a network terminal file system (NTFS) application.

In many instances, in addition to an electronic copy of the document, a hardcopy of the document is required as well. One method of obtaining a hardcopy involves the use of a printing apparatus, such as a digital copier. In a typical case, to obtain a hardcopy of the electronic document, the document recipient opens the document using its associated application, and then prints the document on the digital copier using the application's print function. In another instance, the document sender wants the document recipient to have a "print-ready" copy of the document. In this case, the document sender makes use of the digital copier's electronic mailbox feature. Most digital copiers contain electronic mailboxes, where an electronic mailbox is assigned to a particular user of that digital copier. It works in much the same manner as the e-mail electronic virtual mailbox. However, instead of e-mailing the document to the digital copier, the document sender prints the document to the document recipient's electronic mailbox residing on the digital copier.

The current approach of providing the document recipient with an electronic copy of the document via e-mail and a "print-ready" copy requires two separate actions on the part of the document sender. The document sender must go through the steps of e-mailing a copy of the document to the document recipient, as well as go through the steps of storing a "print-ready" copy on the digital copier. These separate actions are necessary because there is no connectivity between the document recipient's e-mail electronic virtual mailbox and the document recipient's digital copier electronic mailbox.

In addition, in order to send a document to the document recipient's digital copier electronic mailbox, the document sender must have knowledge of the identification format used to identify the document recipient's electronic mailbox on the digital copier. This identification format is typically not user friendly (i.e., mailboxes are identified by numbers not users and the association between numbers and users is not readily available).

Another problem is that the assignment of users to digital copier electronic mailboxes can vary from digital copier to digital copier. For example, in a company with two digital copiers, an employee could be assigned electronic mailbox "1" on the first digital copier and electronic mailbox "2" on the second digital copier. Or, an employee may only be assigned an electronic mailbox on only one of the digital copiers. Under either scenario, a co-worker wanting to provide a "print-ready" copy of a document to the employee's digital copier electronic mailbox would have to know which digital copier or copiers the employee was assigned to and what the employee's electronic mailbox number was on each digital copier. In order to provide any future documents, the co-worker would have to keep track of this information. The same problems apply when trying to provide an electronic copy of the document via other electronic document transfer applications (e.g. FTP).

What is needed is an application that simplifies the process for providing recipients with an electronic copy of a document via an electronic document transfer application and a "print-ready" copy of the document via a printing apparatus.

SUMMARY OF THE INVENTION

It is an object of the foregoing invention to address the foregoing difficulty by providing an application that simplifies the process for providing recipients with an electronic copy of a document via an electronic document transfer application and a "print-ready" copy via a printing apparatus.

Thus one aspect of the present invention is method for distributing electronic documents to at least one storage location of an electronic document transfer application and to at least one electronic mailbox residing on at least one printing apparatus. A client application executes to transmit the electronic documents, while a complimentary server application functions to receive the electronic documents from the client application. The server application associates the at least one storage location of the electronic document transfer application with the at least one electronic mailbox residing on the at least one printing apparatus and transmits the electronic documents to the at least one electronic mailbox residing on the least one printing apparatus based on the association. In addition, an electronic document transfer application functions to receive the electronic documents from either the client application or the server application. The electronic addresses corresponding to the at least one storage location of the electronic document transfer application are the same as the electronic addresses corresponding to the at least one electronic mailbox residing on the at least one printing apparatus.

In yet another aspect, the at least one printing apparatus includes a scanning function, where the client application initiates the scanning operation. The results of the scanning operation are stored in at least one electronic mailbox residing on the printing apparatus and transmitted to the electronic document transfer application.

In still yet another aspect, retrieval of an electronic document is attempted from an electronic mailbox residing on a first printing apparatus. If the electronic mailbox from which the retrieval is attempted does not reside on the first printing apparatus, the electronic document is retrieved from a second printing apparatus, where the electronic document is transmitted from the second printing apparatus to the first printing apparatus.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

The preferred embodiment of the present invention comprises a plurality of client computers and a plurality of printing apparatuses. In order to simplify the following description, reference will be made to only one client computer and two printing apparatuses, where the printing apparatuses are digital copiers. This should not be seen in anyway to limit the scope of the present invention. In addition, an e-mail application will be used as the electronic document transfer application in the description of the present invention. Any electronic transfer document application, such as FTP or NTFS enabling practice of the present is applicable.

Figure 1:
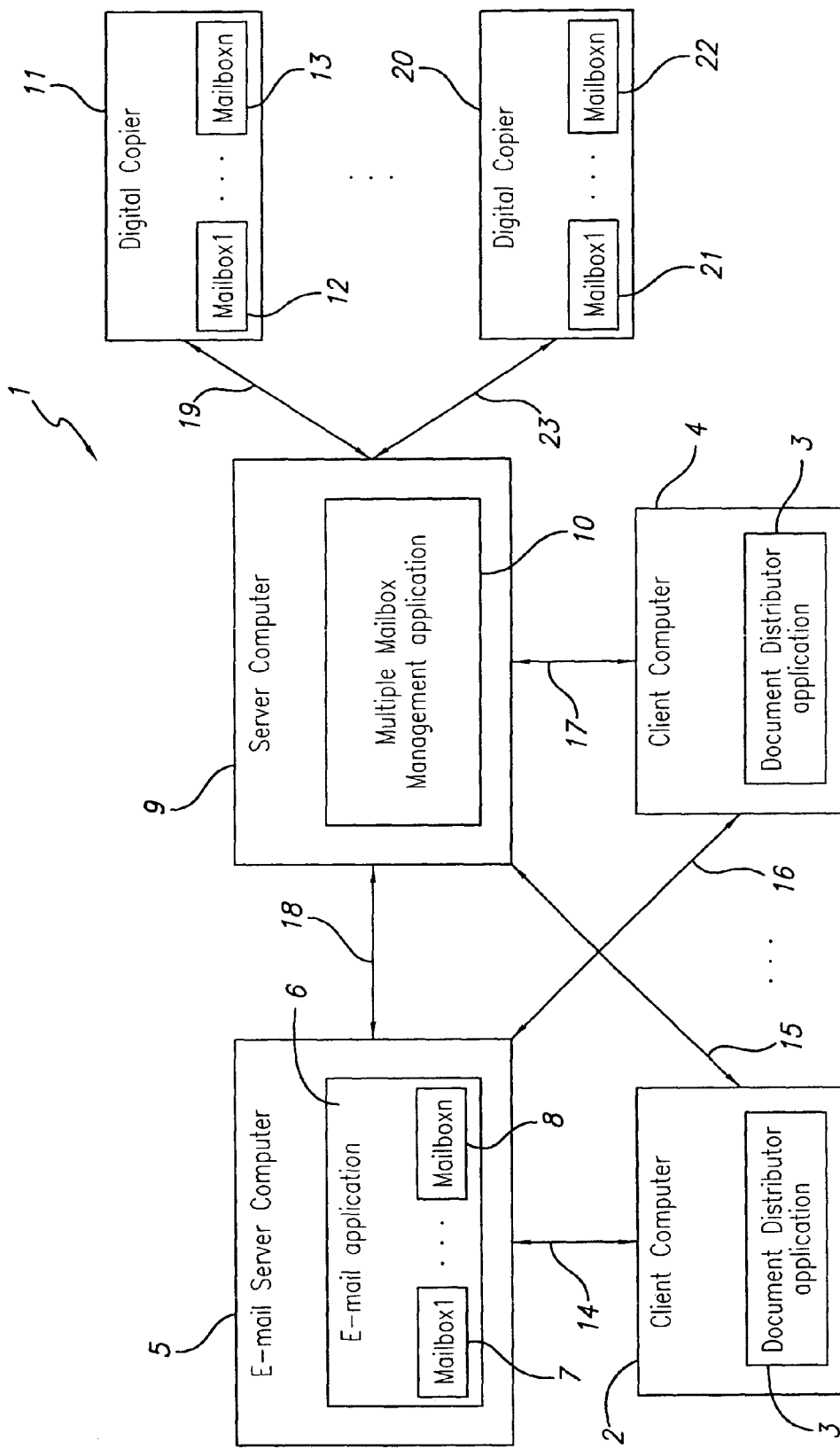
FIG. 1 is a representational view depicting a general configuration of the system of the present invention.

FIG. 1 is a representational view depicting a general configuration of the system of the present invention. Document distribution system 1 includes e-mail server computer 5, server computer 9, digital copier 11, digital copier 20, and client computers 2, 4. Client computers 2, 4 are connected to e-mail server computer 5 and server computer 9 via a network interface 14, 15, 16, and 17. E-mail server computer 5 and server computer 9 are connected via network interface 18. Server computer 9 is connected to digital copier 11 via network interface 19 and digital copier 20 via network interface 23.

E-mail server contains e-mail application 6, such as Microsoft® Outlook®. E-mail application includes a plurality of electronic virtual mailboxes 7, 8. Server computer 9 contains server application, hereinafter referred to as multiple mailbox management application 10, of the present invention. Client computers 2, 4 contain client application, hereinafter referred to as document distributor application 3, of the present invention. Digital copier 11 includes a plurality of electronic mailboxes 12, 13 and digital copier 20 includes a plurality of electronic mailboxes 21, 22.

Figure 2:
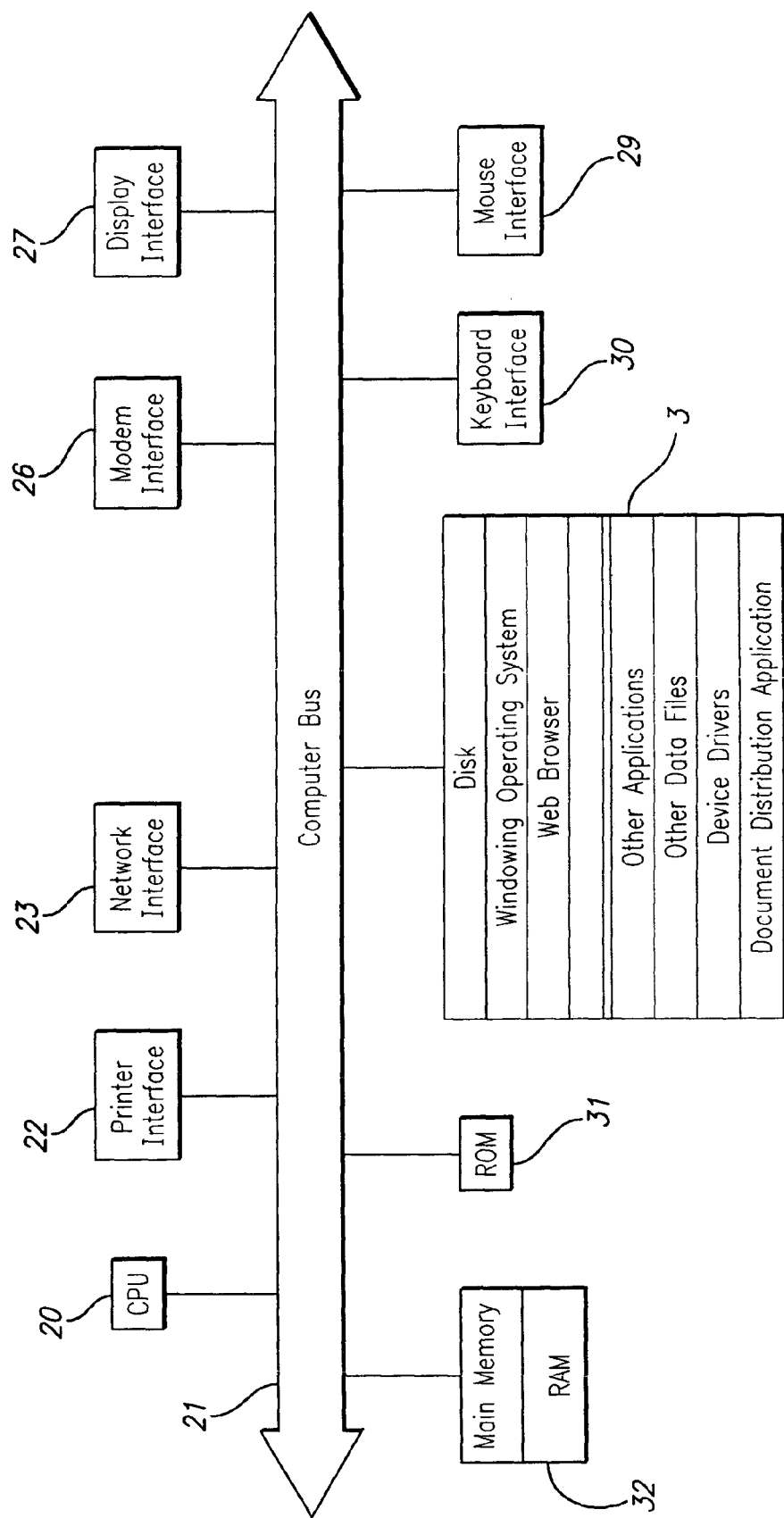
FIG. 2 is a block diagram illustrating the internal architecture of a computer utilizing the document distribution application of the present invention.

FIG. 2 is a block diagram of the internal architecture of client computer 2 and 4. Shown in FIG. 2 is CPU 20, which is preferably a Pentium-type microprocessor, interface to computer bus 21. Also interface to computer bus 21 are printer interface 22, to allow client computer 4, 8 to communicate with a local printer (not shown), network interface 23 to enable communications between client computer 2, 4 and a network, modem interface 26 to enable communications between client computer 4, 8 and its internal modem (not shown), display interface 27 for interfacing with a display monitor (not shown), keyboard interface 30 for interfacing with a keyboard (not shown), and mouse interface 29 for interfacing with a mouse (not shown). Of course, if client computer 4, 8 connects to the World Wide Web 12 by a connection other than a telephone connection, a suitable interface other than modem interface 26 by be utilized.

Read only memory (ROM) 31 stores invariant computer-executable process steps for basic system functions such as basic I/O, start-up, or reception of keystrokes from a keyboard. Main random access memory (RAM) 32 provides CPU 20 with memory storage that can be accessed quickly. In this regard, computer-executable process steps of the document distributor application of the present invention or other applications are transferred from disk 3 over computer bus 21 to RAM 32 and executed therefrom by CPU 20.

Also shown in FIG. 2 is disk 3, which, in addition to the application of the present invention, includes a windowing operating system, a web browser executable on the particular windowing operating system, other applications which may include word processing, spreadsheet, graphics, and gaming applications. Disk 3 further includes data files and device drivers as shown.

Figure 3:
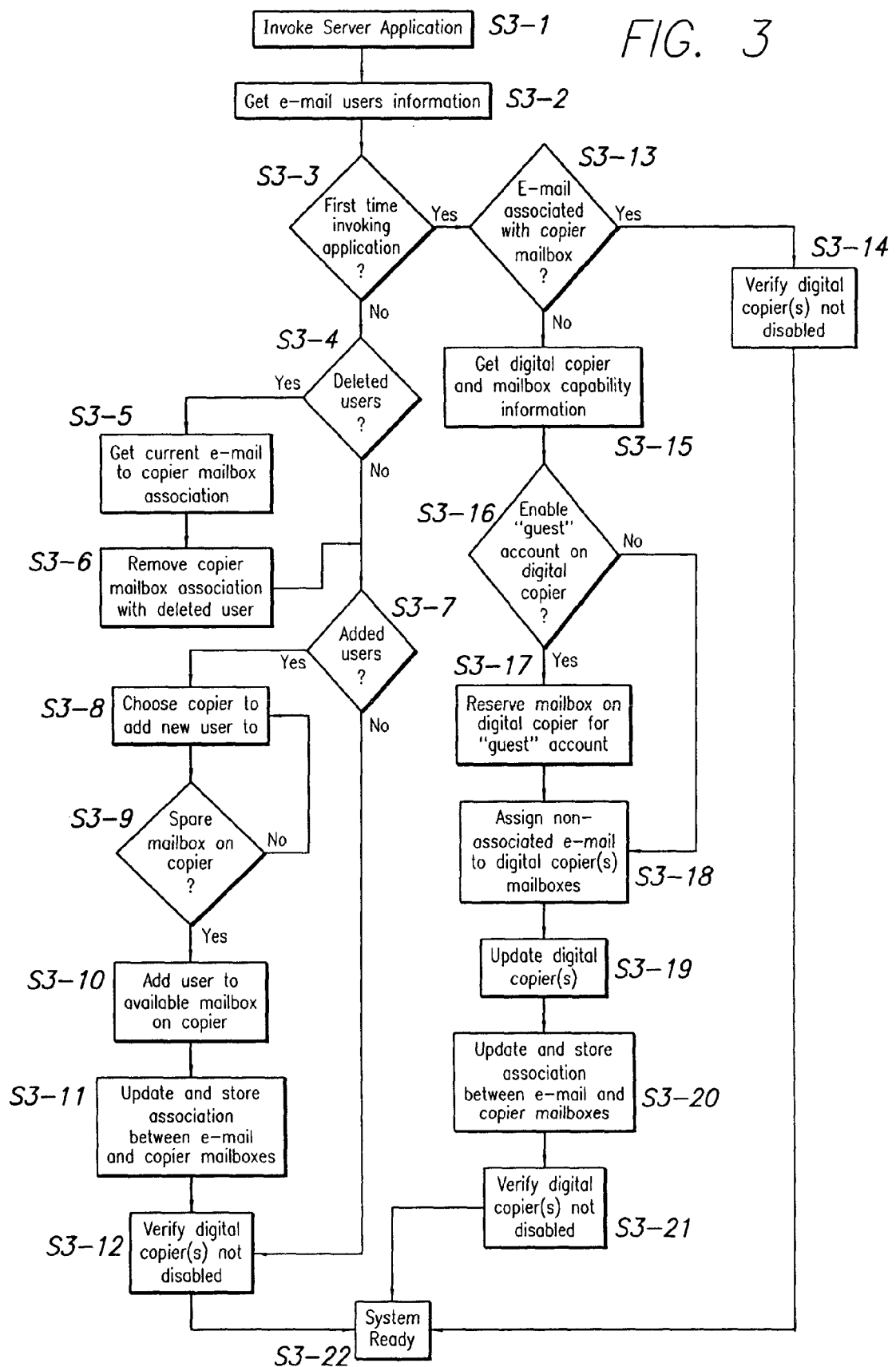
FIG. 3 is a flowchart describing the preferred embodiment for configuring the server application of the present invention.

FIG. 3 is a flowchart describing the preferred embodiment for configuring multiple mailbox management 10 of the present invention. Briefly, multiple mailbox application 10 is configured to associate electronic virtual mailboxes 7, 8 of e-mail application 6 with electronic mailboxes 12, 13 residing on digital copier 11. Part of this association includes ensuring that the electronic addresses of e-mail application's 6 electronic virtual mailboxes 7, 8 are the same as the electronic addresses of digital copier's 11 electronic mailboxes 12, 13. Configuration of multiple mailbox application 10 also includes establishing a "guest" electronic mailbox, hereinafter referred to as a guest account, on digital copier 11 to enable a user to retrieve a document when the user has not been assigned an electronic mailbox 12, 13 on digital copier 11.

In more detail, multiple mailbox application 10 is initiated in step S3-1. In step S3-2, a list of current e-mail application 6 users is obtained. A check is then made in step S3-3 whether multiple mailbox application 10 had previously been invoked. If multiple mailbox application 10 had previously been invoked, flow proceeds to step S3-4, where a determination is made whether any e-mail application 6 users have been deleted since the last time multiple mailbox application 10 was run. If no users were deleted, flow proceeds to step S3-7 described below. If any users were deleted, than the current e-mail application mailbox to digital copier mailbox association, which is described in more detail below, is retrieved in step S3-5. The association for deleted users is removed in step S3-6.

Flow then proceeds to step S3-7, where a check is made to determine whether any e-mail application 6 users were added since the last time multiple mailbox application 10 was run. If no users were added, flow proceeds to step S3-12 described below. If any users were added, in step S3-8, the digital copiers to add electronic mailboxes for the new user(s) are chosen. Preferably, each user is assigned an electronic mailbox in each available digital copier. For example, in the system of FIG. 1, each user would be assigned an electronic mailbox in digital copier 11 and digital copier 20. In addition, the same electronic address used to define the electronic mailbox in digital copier 11 would be used to define the electronic mailbox in digital copier 20. This is done so a document sender does not have to remember which digital copier(s) a document recipient is assigned to and what the document recipient's address is for a particular digital copier.

Returning to the flow of FIG. 3, in step S3-9, the chosen digital copier(s) are checked to ensure there are enough spare electronic mailboxes to accommodate the new user(s). If there are not enough spare electronic mailboxes on a particular digital copier, a different one must be chosen in step S3-8. If enough spare electronic mailboxes exist on a particular digital copier, then in step S3-10, the new user(s) are assigned an electronic mailbox on that digital copier. Once all the new users have been assigned respective electronic mailboxes, e-mail application electronic virtual mailbox to digital copier mailbox association, as described below, is updated and saved in step S3-11. Flow proceeds to step S3-12, where verification is performed to ensure that multiple mailbox application 10 did not disable any of the digital copiers. From there, multiple mailbox application 10 is ready to accept new input (step S3-22).

If, in step S3-3, the determination is that multiple mailbox application 10 is being invoked for the first time, flow proceeds to step S3-13. Step S3-13 verifies whether e-mail application's 6 electronic virtual mailboxes 7, 8 have been associated with digital copier's 11 electronic mailboxes 12, 13. This step is performed for all available digital copiers. If they have been associated, in step S3-14 verification is performed to ensure that multiple mailbox application 10 did not disable any of the digital copiers.

Flow proceeds to step S3-15 in the event that one or more of e-mail application's 6 electronic virtual mailboxes 7, 8 have not been associated with digital copier's 11 electronic mailboxes 12, 13. This would also be the case if no association existed with respect to any other available digital copier. In step S3-15, multiple mailbox application 10 obtains information and mailbox capabilities from digital copier 11. This includes data such as network information, digital copier's user-friendly name, and number of electronic virtual mailboxes. Once this information is obtained, in step S3-16, a decision is made whether to allow a user assigned an electronic mailbox one (i.e., digital copier 11) and not one on another digital copier (i.e., digital copier 20) access to a guest account on digital copier 11.

If access to a guest account is desired, in step S3-17, at least one electronic mailbox on digital copier 11 is reserved for a guest account. Typical digital copiers contain up to 100 electronic mailboxes. Preferably, 99 would be reserved for assigned users and one reserved as the guest account. However, any combination of assigned users and guest accounts that would enable practice of the present invention would be applicable. If access to a guest account is not desired, or after a guest account has been created, flow proceeds to step S3-18.

In step S3-18, any e-mail application 6 electronic virtual mailboxes 7, 8 not associated with any digital copier 11 electronic mailboxes 12, 13, are associated. This association step includes assigning the electronic mailbox 12 on digital copier 11 the same electronic addresses as that of the corresponding e-mail application 6 electronic virtual mailbox 7. Upon completion of the association in step S3-18, in step S3-19, digital copier 11 is assigned the electronic mailboxes. In the preferred embodiment, the assignment is done on a logical user group basis. In other words, rather than update digital copier 11 on a user-by-user basis, digital copier 11 is updated using a logical user group. For example, if digital copier 11 is located in a particular area of an office environment, all users within the same area are placed into a single logical user group that would be used to update digital copier's 11 electronic virtual mailboxes. Under this embodiment, if multiple user changes occur at the same time, digital copier 11 would only have to be updated once. Updating digital copier 11 manually is not precluded by this embodiment.

Following step S3-19, in step S3-20, the e-mail application electronic virtual mailbox to digital copier electronic mailbox association is updated and saved. In step S3-21, verification is performed to ensure that multiple mailbox application 10 has not disabled any of the digital copiers. From there, multiple mailbox application 10 is ready to receive new input (step S3-22).

Figure 4:
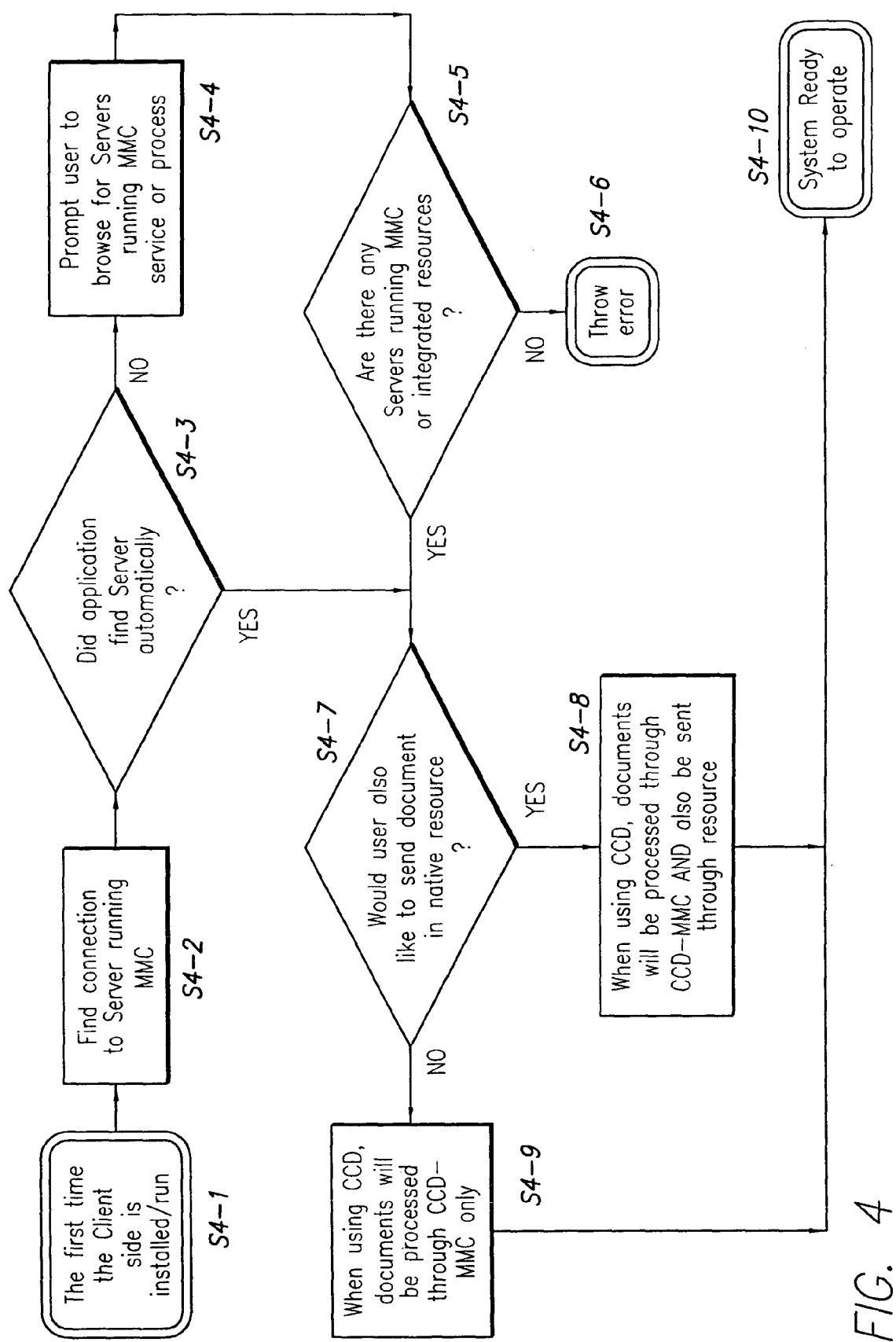
FIG. 4 is a flowchart describing the preferred embodiment for configuring the client application of the present invention.

FIG. 4 is a flowchart describing the preferred embodiment for configuring the document distributor application of the present invention. Briefly, document distributor application 3 is configured to allow a user at client computer 1 to provide a recipient with an electronic copy of a document as well as a "print-ready" copy of the document at a digital copier.

More specifically, in step S4-1, document distributor application 3 is initiated. In step S4-2, document distributor application 3 attempts to locate the server running multiple mailbox application 10. If, in step S4-3, document distributor application 3 did not automatically locate server 9, the user is prompted to browse for a server running multiple mailbox application 10 in step S4-4. If in step S4-5 no server is found, an error is returned to the user in step S4-6.

If, in step S4-3 server 9 is found or if the user finds server 9 in step S4-5, flow proceeds to step S4-7. In step S4-7, the user determines whether to provide a recipient with only "print-ready" copies of an electronic document or both a "print-ready" copy and an electronic copy. Flow then proceeds either to step S4-8 ("print-ready " and electronic copy) or step S4-9 ("print-ready" only), and then to step S4-10, where document distributor application 3 is ready to receive input.

Figure 5A:
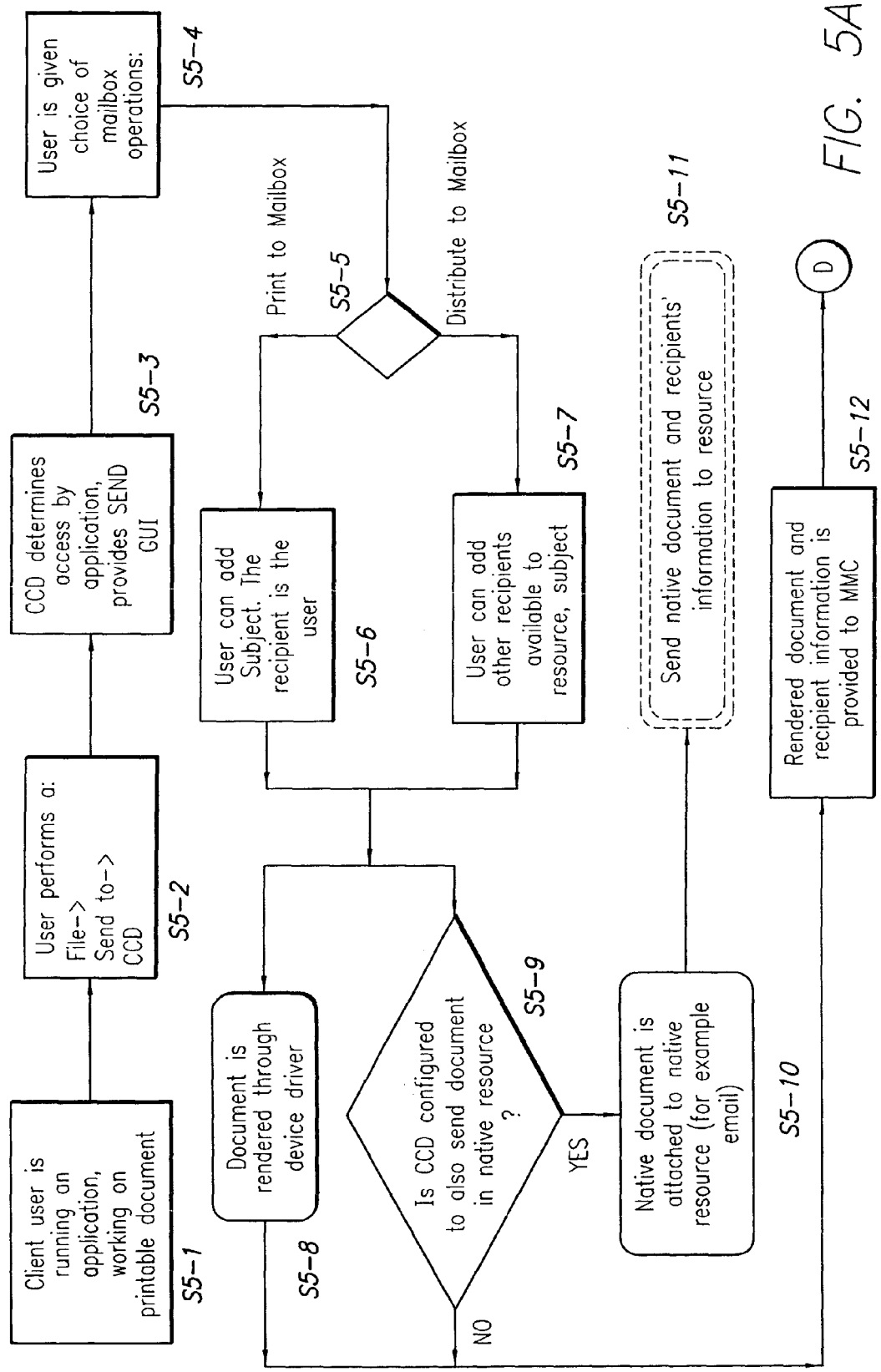
FIG. 5 is a flowchart describing providing an electronic document according to the present invention.
Figure 5B:
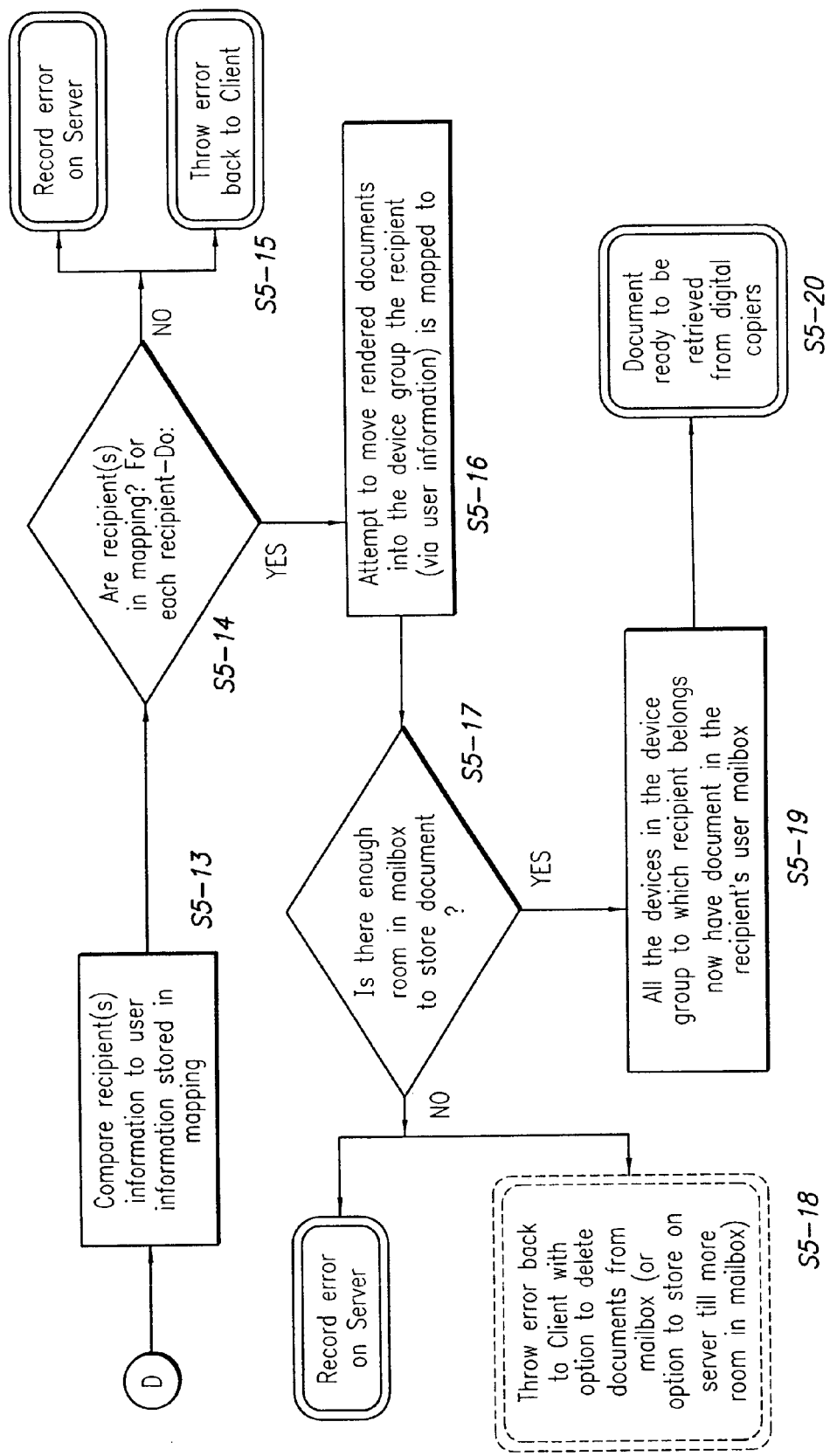

FIG. 5 is a flowchart describing providing an electronic document according to the present invention. Briefly, a user on client computer 2 invokes document distributor application 3 from the application associated with the electronic document to be transmitted. The user is provided with options where to transmit the electronic document, including digital copier 11. Upon receipt of the document by digital copier 11, digital copier 11 determines whether the recipient has been assigned an electronic mailbox 12 and whether there is enough memory in the electronic mailbox 12 to store the document.

The detailed description of FIG. 5 is provided with respect to document distributor application 3 running in a Microsoft® Windows operating system environment. However, document distributor application 3 is not limited to this environment and any Microsoft® Windows operating system specific references are meant for illustrative purposes only. In more detail, in step S5-1, the electronic document is opened in its native application, i.e., Microsoft® Word. In step S5-2, the user initiates document distributor application 3 from the native application. For example, in Microsoft® Word, the "File" option is chosen from the Word toolbar, followed by selection of the "Send To" option in the ensuing drop-down menu. Within the "Send To" menu, the user would select the option associated with document distributor application 3.

Figure 6:
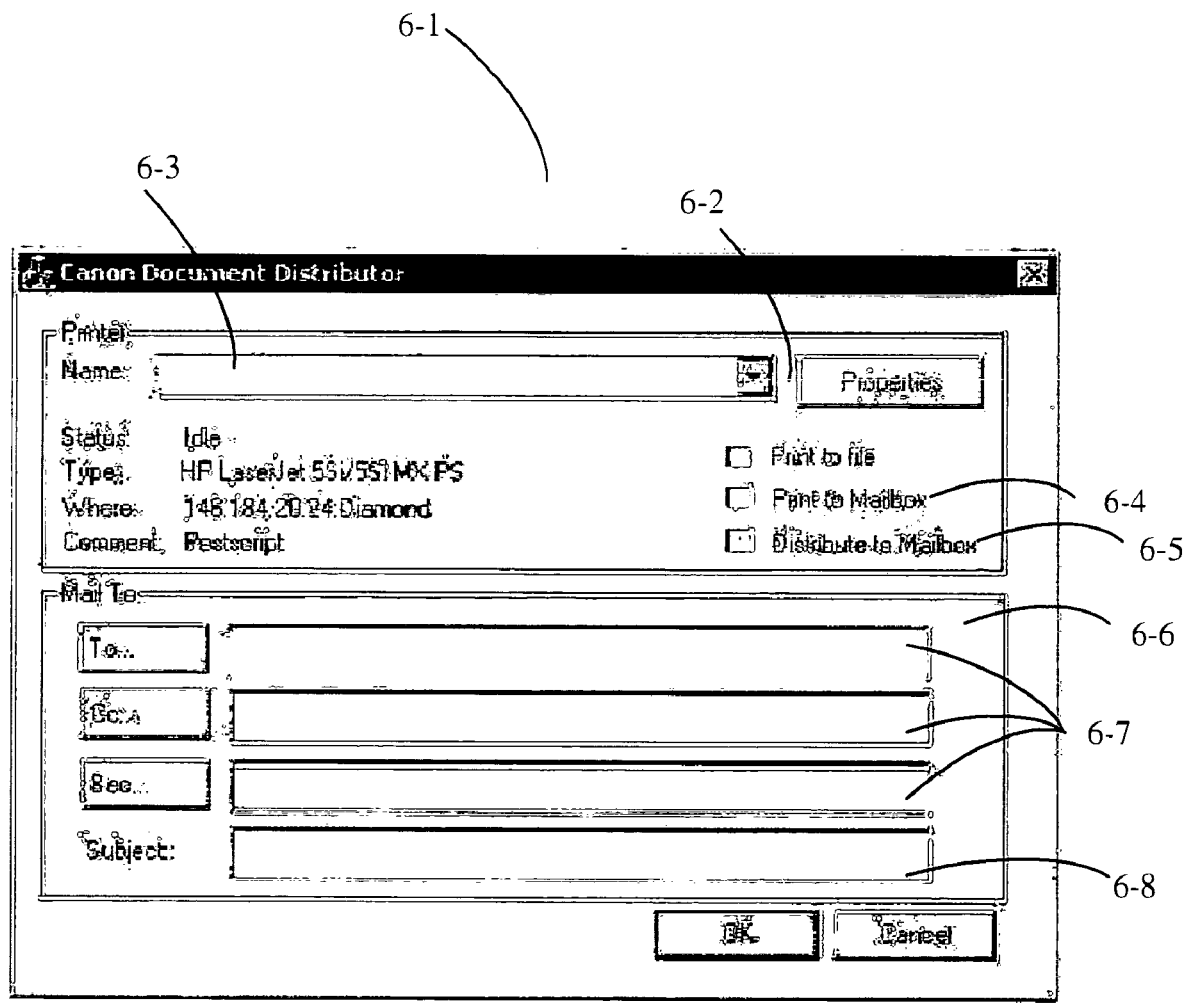
FIG. 6 depicts a user interface for transmitting an electronic document according the present invention.

In step S5-3, the user is provided with user interface 6-1 of FIG. 6. User interface 6-1 contains two sections, Printer section 6-2 and Mail To section 6-6. Printer section 6-2 contains, among other things, "Name" field 6-3, "Print to Mailbox" field 64, and "Distribute to Mailbox" field 6-5. All three fields preferably default to an unselected state. In the preferred embodiment, if no digital copier is selected in "Name" field 6-5, when the electronic document is transmitted to the digital copier as described below, the electronic document is transmitted to the appropriate electronic mailbox on each digital copier where that electronic mailbox exists. In another embodiment, the user can transmit the electronic document to only a specific digital copier by selecting the digital copier in "Name" field 6-3. Mail To section 6-6 contains, among other things, "Recipients" field 6-7 and "Subject" field 6-8. These two fields default to the unselected state as well.

Figure 7:
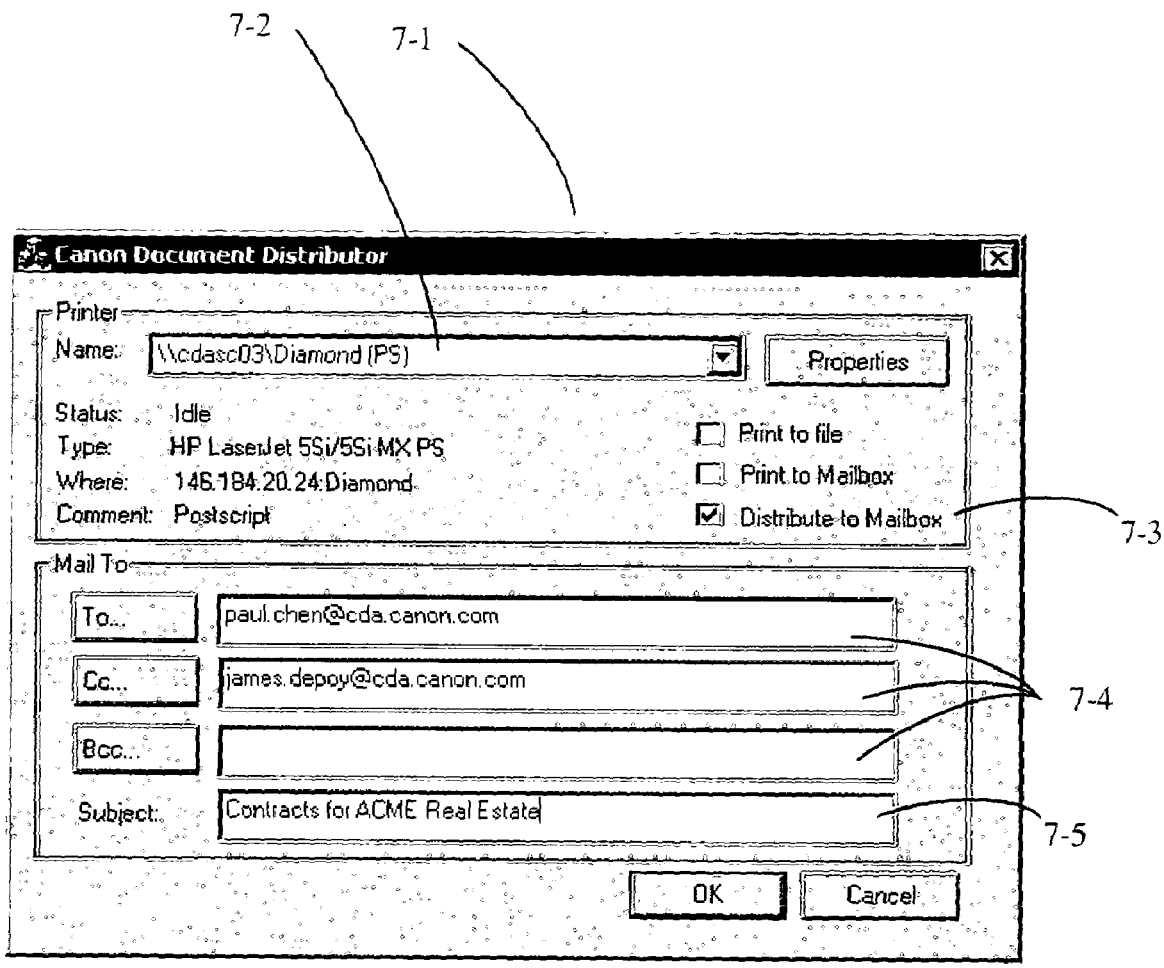
FIG. 7 depicts a user interface for transmitting an electronic document according to one embodiment of the present invention.

Returning to the flow of FIG. 5, in step S5-4 the user determines which type of mailbox operation to invoke. If "Distribute to Mailbox" option 6-5 is chosen, user interface changes to user interface 7-1 of FIG. 7. User interface 7-1 is similar to user interface 6-1, except that "Distribute to Mailbox" field 7-3 is checked, and that "Recipients" field 7-4 and "Subject" field 7-5 are unlocked and data can be entered in these fields. In step S5-7 the user selects the recipients to whom the electronic document is to be sent in "Recipients" field 74 and enters the subject of the document in "Subject" field 7-5. User interface 7-1 illustrates selection of a specific digital copier in "Name" field 7-2.

Figure 8:
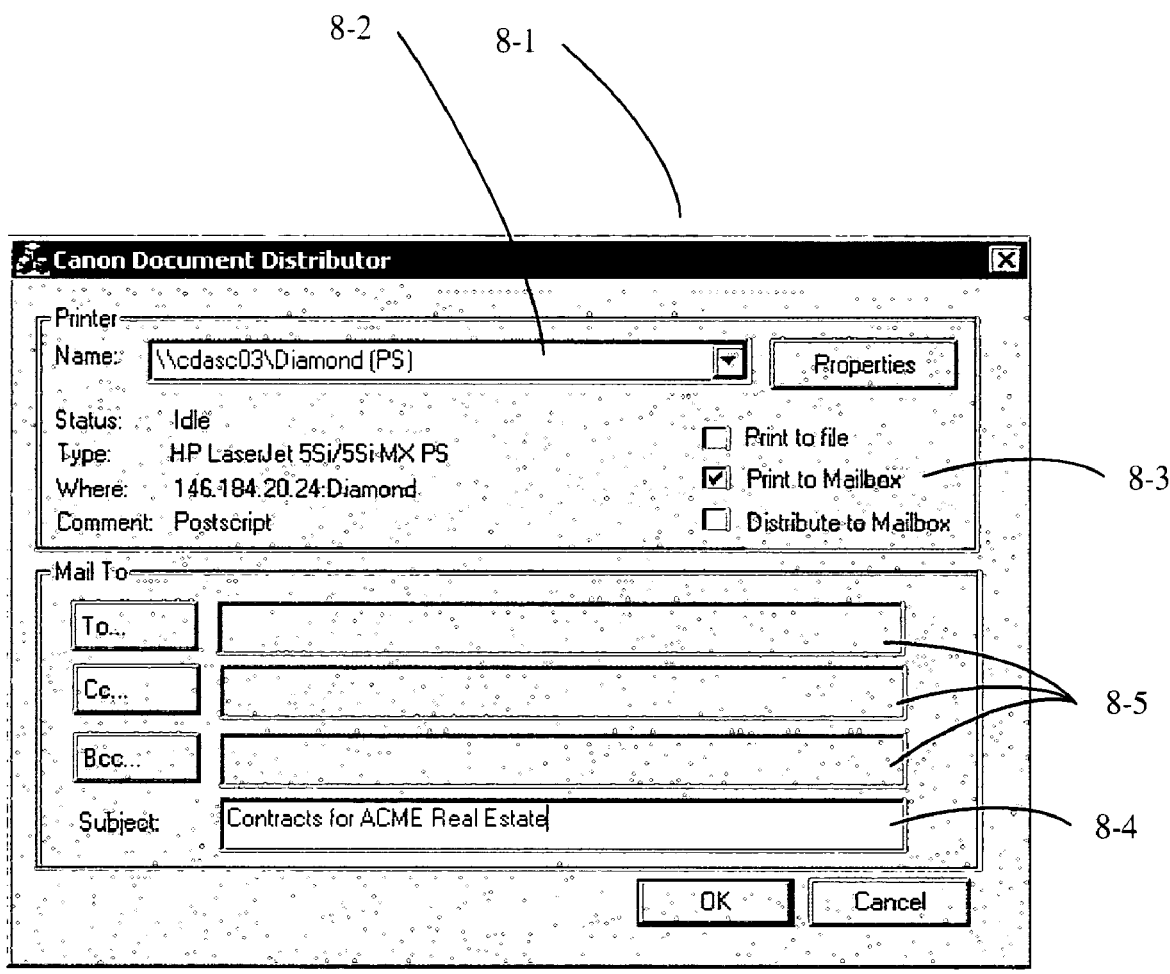
FIG. 8 depicts a user interface for transmitting an electronic document according to another embodiment of the present invention.

If "Print to Mailbox" field 64 is chosen, user interface 6-1 changes to user interface 8-1 of FIG. 8. User interface 8-1 is similar to user interface 7-1, except that "Print to Mailbox" field 8-3 is checked and "Subject" field 84 is unlocked and data can be entered in this field. Because the only recipient under this option is the user, "Recipients" field 8-5 remains grayed-out. In step S5-6, the user enters the subject of the document in "Subject" field 84. User interface 8-1 also illustrates selection of a specific printer.

After the user has chosen the mailbox operation and entered the appropriate information on the appropriate user interface, flow proceeds to step S5-8 where the document is rendered by the selected digital copier's associate device driver located on client computer 2. In step S5-12, the rendered document is transmitted to multiple mailbox application 10 residing on server computer 9. The transmitted data includes the document, as well as the recipient(s)' user information, which corresponds to the recipient(s)' e-mail application 6 electronic virtual mailbox 7.

In step S5-9, if document distributor application 3 was configured in step S4-7 to provide both a "print-ready" copy and an electronic copy of the electronic document, an electronic copy of the electronic document is attached as a file to an e-mail message in step S5-9 and in step S5-10, the e-mail message and attached file would be sent to the recipient's e-mail application 6 electronic virtual mailbox 7.

In step 5-13, after receiving the rendered document from document distributor application 3, multiple management application 10 verifies that recipient(s)' user information is associated with a digital copier's electronic mailbox 12. If, in step S5-14 it is determined no association exists, an error is recorded on server 9 and sent to the user in step S5-15. If, in step S5-14, it is determined an associated exists, in step S5-16, multiple mailbox application 10 preferably attempts to transmit the rendered document to the appropriate electronic mailbox on all the available digital copiers where that electronic mailbox resides. In another embodiment, the rendered document is transmitted to the appropriate electronic mailbox on a specified digital copier as illustrated in "Name" field 7-2, 8-2.

A check is performed in step S5-17 ensure there is enough memory in each electronic mailbox to store the rendered document. For those electronic mailboxes with enough memory, the rendered document is stored at that location, per step S5-19. Flow then proceeds to step S5-20, where the document is ready to be retrieved. If a particular electronic mailbox does not have enough memory, in step S5-18, an error is recorded on server 9 and the user is presented with an error and an option to either delete documents from the mailbox or temporarily store the document on server 9.

Figure 9A:
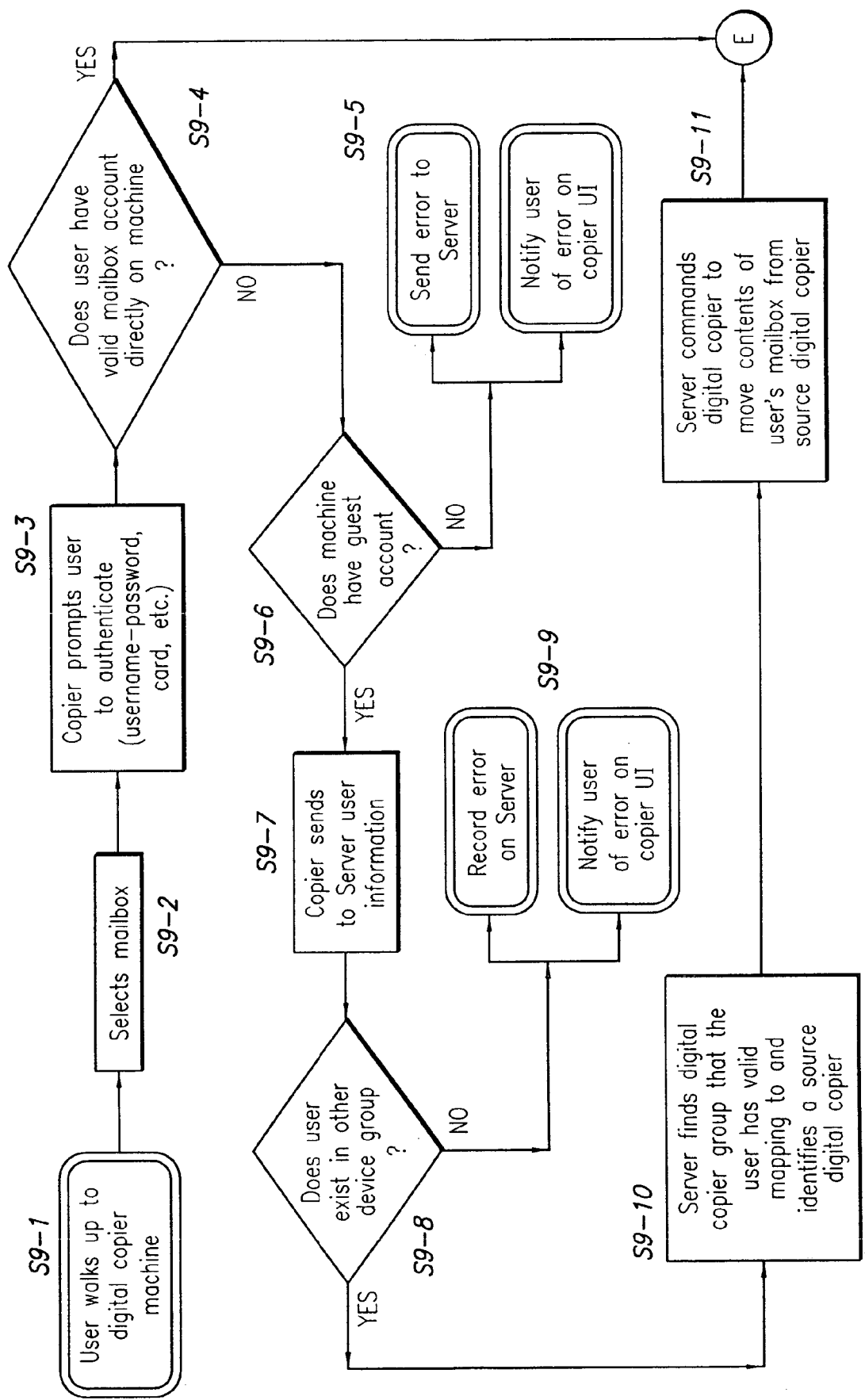
FIG. 9 is flowchart describing retrieving a hardcopy of an electronic document according to the present invention.
Figure 9B:
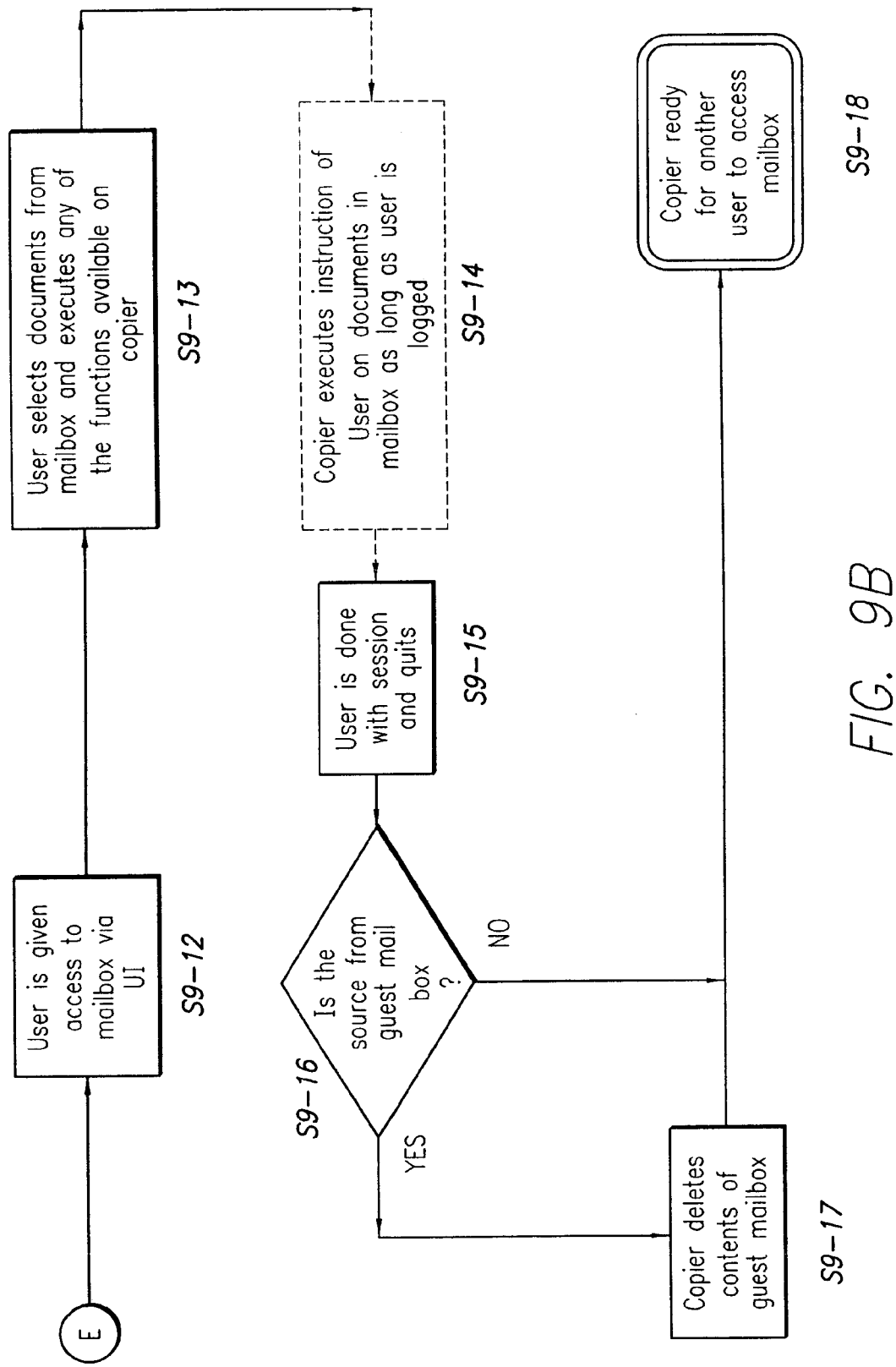

FIG. 9 is a flowchart describing retrieving a hardcopy of an electronic document according to the present invention. Briefly, of the steps depicted in FIG. 9 associated with retrieving a document from a user's digital copier's electronic mailbox, steps S9-1, S9-2, S9-3, S9-4 ("yes" branch), S9-13, S9-14, S9-15, and S9-16 are consistent with the current state of the art. Since they are not part of the present invention, they are only being included to provide a complete picture of the environment in which the present invention operates. No detailed discussion associated with these steps is being provided.

The present invention's feature begins when the determination is made in step S9-4 that the user attempting to access digital copier 11 does not have a valid electronic mailbox 13 on the digital copier 11. In step S9-6, a check is made whether a guest account was created on digital copier 11. If no guest account was established, in step S9-5, an error is recorded on server 9 and the user is notified of the error via digital copier's 11 user interface.

Flow proceeds to step S9-7 in the event that a guest account has been established on digital copier 11. In step S9-7, digital copier 11 transmits to multiple mailbox application 10, user information entered when the user attempted to retrieve a document. This information can include the user's electronic mailbox information. Upon receiving the information, in step S9-8, multiple mailbox application 10 verifies whether the user has an associated electronic mailbox on any other digital copier. If the user does not, in steps S9-9, an error is recorded on server 9 and the user is notified of the error via digital copier's 11 user interface.

If it is determined that the user has an electronic mailbox on another digital copier (i.e., digital copier 20), in step S9-10, multiple mailbox application 10 locates digital copier 20. Digital copier 20 is located via the association between e-mail application electronic virtual mailboxes and digital copier electronic mailboxes. Returning to the flow of FIG. 9, in step S9-11, multiple mailbox application 10 instructs the digital copier 20 to transmit the contents of the user's electronic mailbox to the guest account on digital copier 11.

The other steps of FIG. 9 related to the present invention are steps S9-16 through S9-18. In step S9-16, a check is made whether the document was retrieved from a guest account. In the event it was, flow proceeds to step S9-17, where the guest account is deleted after the document is retrieved. After the guest account is deleted, or if the document was not retrieved from a guest account, in step S9-18, digital copier 11 is ready for another mailbox to be accessed.

Figure 10A:
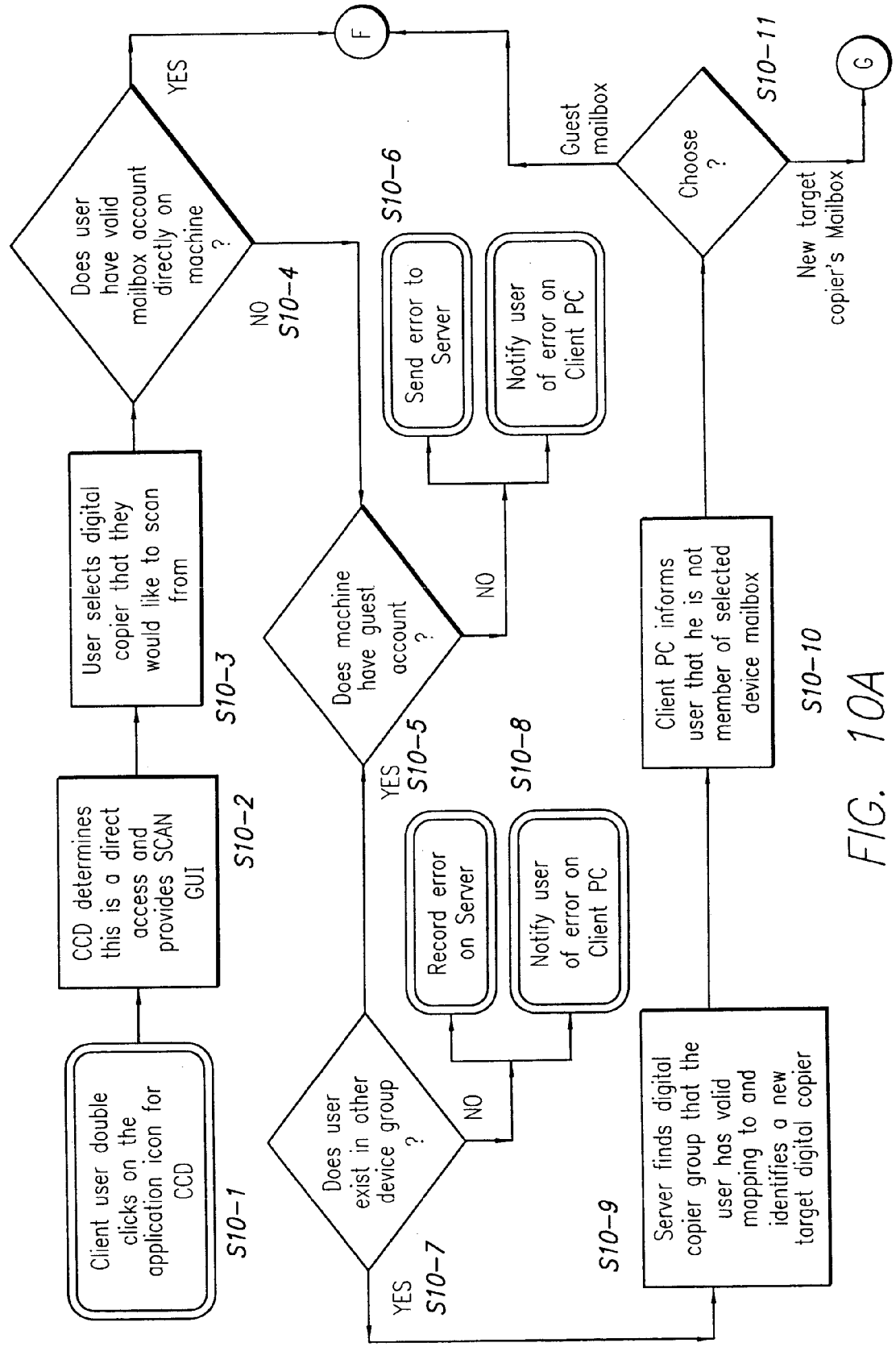
FIG. 10 is a flowchart describing scanning a document using the client application of the present invention.
Figure 10B:
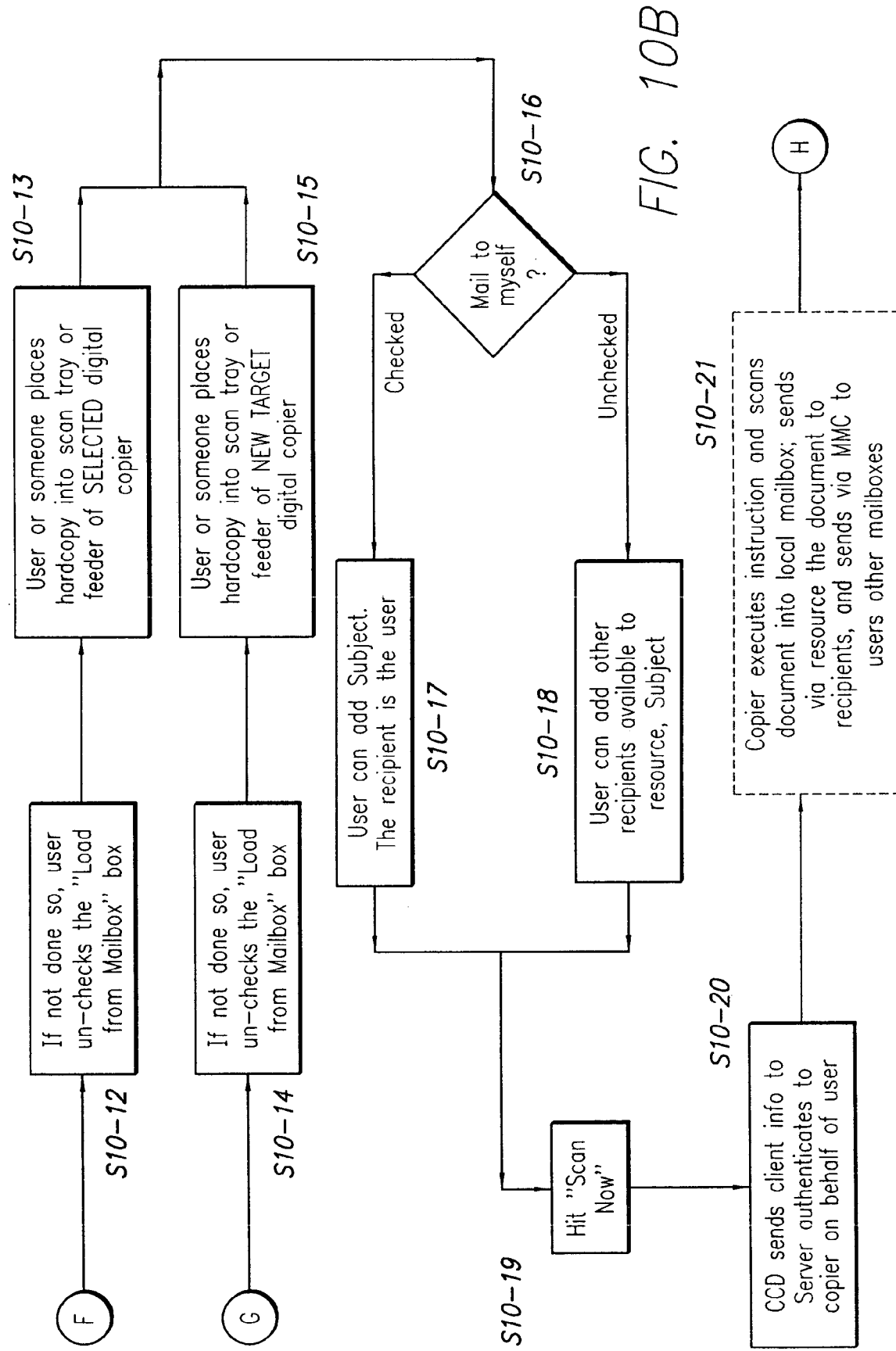
Figure 10C:
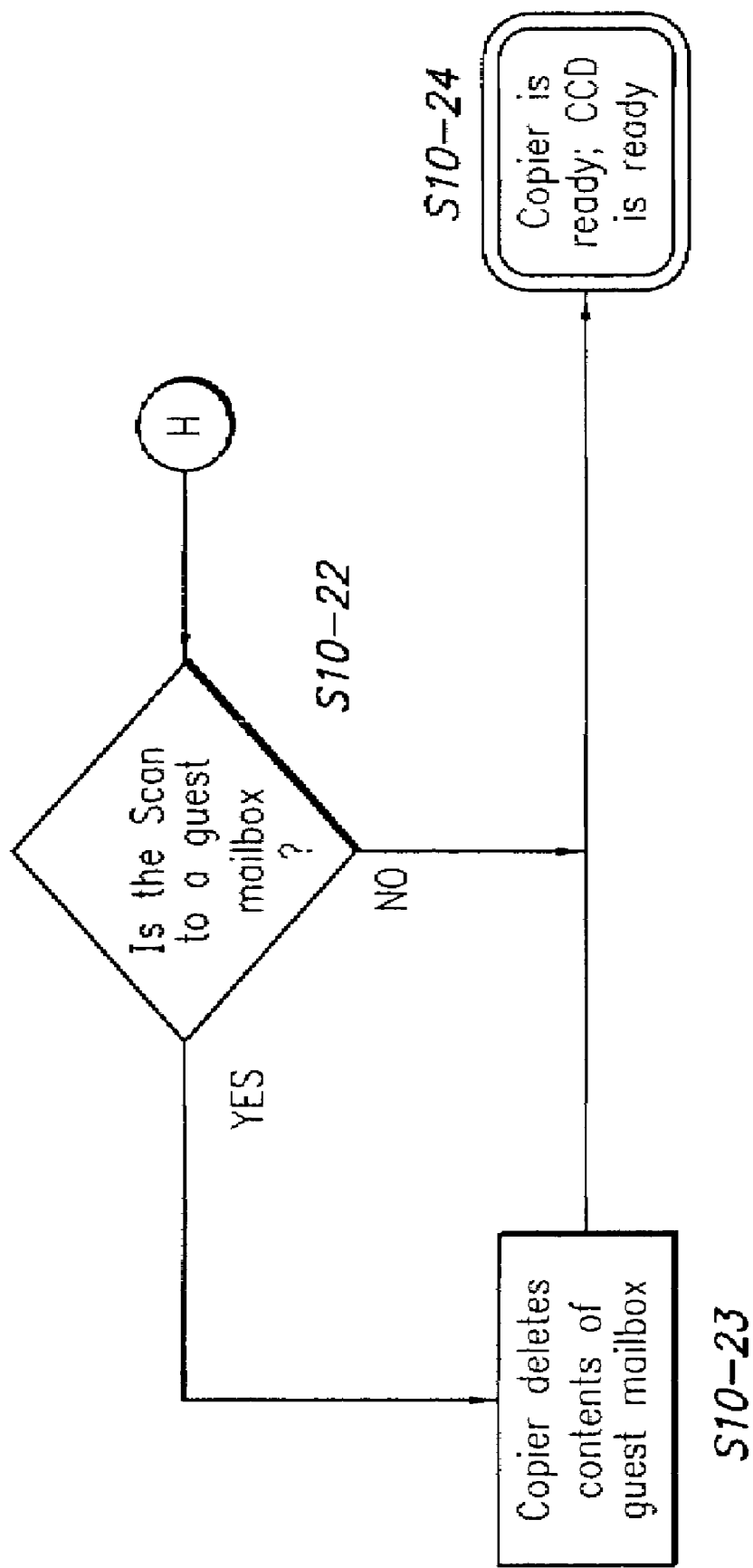
Figure 11:
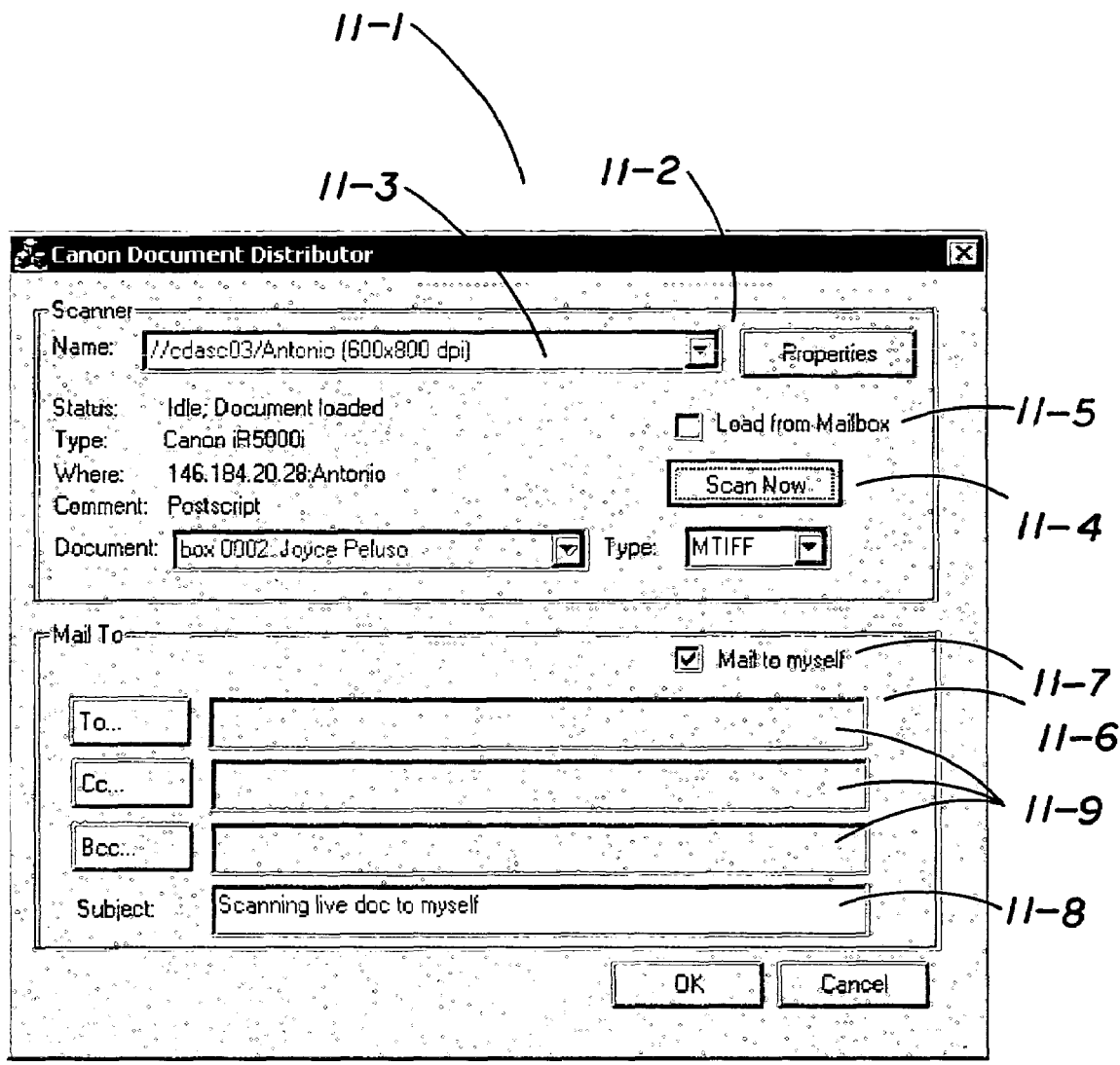
FIG. 11 depicts the user interface for scanning a document according to one embodiment of the present invention.

FIG. 10 is a flowchart describing scanning a document using document distributor application 3 of the present invention. Briefly, using document distributor application 3, a user is able to scan a document at digital copier 11 from client computer 2 via multiple mailbox application 10.

In more detail, in step S10-1, a user initiates document distributor application 3. For example, in a Microsoft®0 Windows operating system environment, a user double clicks on document distributor application 3 icon in the Windows desktop. In step S10-2, document distributor application 3 determines it was initiated outside of an application (i.e., Microsoft® Word), and provides user interface 11-1 as depicted in FIG. 10.

User interface 11-1 is divided into two sections. Scanner section 11-2 contains "Name" field 11-3, "Scan Now" button 114, and "Load from Mailbox" field 11-5. Mail To Section 11-6 contains "Mail to myself" field 11-7, "Subject" field 11-8, and "Recipients" field 11-9. Preferably, "Load from Mailbox" field 11-4 and "Mail to myself" field 11-7 default to the checked state.

Returning to the flow of FIG. 10, in step S10-3, the user selects the digital copier the user is going to scan the document from by filling in the digital copier name in "Name" field 10-2. The name can either be typed in or selected from a drop-down menu. After the digital copier is selected, in step S10-4 verification of whether the user has a valid electronic mailbox on the selected digital copier is performed. If this verification fails, a check is performed in step S10-5 to determine whether the digital copier has been allocated a guest account. If no guest account exits, an error notification is sent to server 9 and to client computer 2 in step S10-6.

If a guest account exits, flow proceeds to step S10-7, where it is determined whether the user has an electronic mailbox on a different digital copier than the one selected in "Name" field 11-3. If the user does not, an error is recorded on server 9 and an error notification is sent to client computer 2 in step S10-8. If the user does have an electronic mailbox on a different digital copier, in step S10-9, multiple mailbox application 10 locates another digital copier where the user has an electronic mailbox. This is accomplished using the association between e-mail application electronic virtual mailboxes and digital copier electronic mailboxes described above.

Next, in step S10-10, multiple mailbox application 10 provides notification to document distributor application 3 on client computer 2 that user does not have a valid electronic mailbox on the selected digital copier. In step S10-11, the user is presented with an option of having the scanned document delivered either to the guest account on the selected digital copier or to the user's electronic mailbox on a different digital copier.

If the user chooses to use the guest account on the selected digital copier, flow proceeds to step S10-12. Returning to step S10-4, if the user has a valid electronic mailbox on the selected digital copier, flow also proceeds to step S10-12. In step S10-12, the user verifies that "Load from Mailbox" field 114 is unchecked, and if not, unchecks it. Next, in step S10-13, the document to be scanned is placed on the scan tray of the selected digital copier. Flow then proceeds to step S10-16, which is described below.

Returning to step S10-11, if the user chooses to use the user's electronic mailbox on a digital copier different than the selected digital copier, the user next verifies that "Load from Mailbox" field 11-4 is unchecked, and if not, unchecks it. (step 10-14). Then, in step S10-15, the document to be scanned is placed on the scan tray of the different digital copier. Flow then proceeds to step S10-16, which is described below.

In step S10-16, "Mail to myself" field 11-7 is either left in the checked state or placed in the unchecked state depending on who the recipient of the scan operation is. If "Mail to myself" field 11-7 is left checked, the user is the only recipient of the scan operation, and in step S10-17, the user need only verify the digital copier in "Name" field 11-3 is where the scan operation is to be performed, and to provide a title for the scanned document in "Subject" field 11-8. Next, in step S10-19, "Scan Now" button 11-4 is selected to initiate the scan operation.

Figure 12:
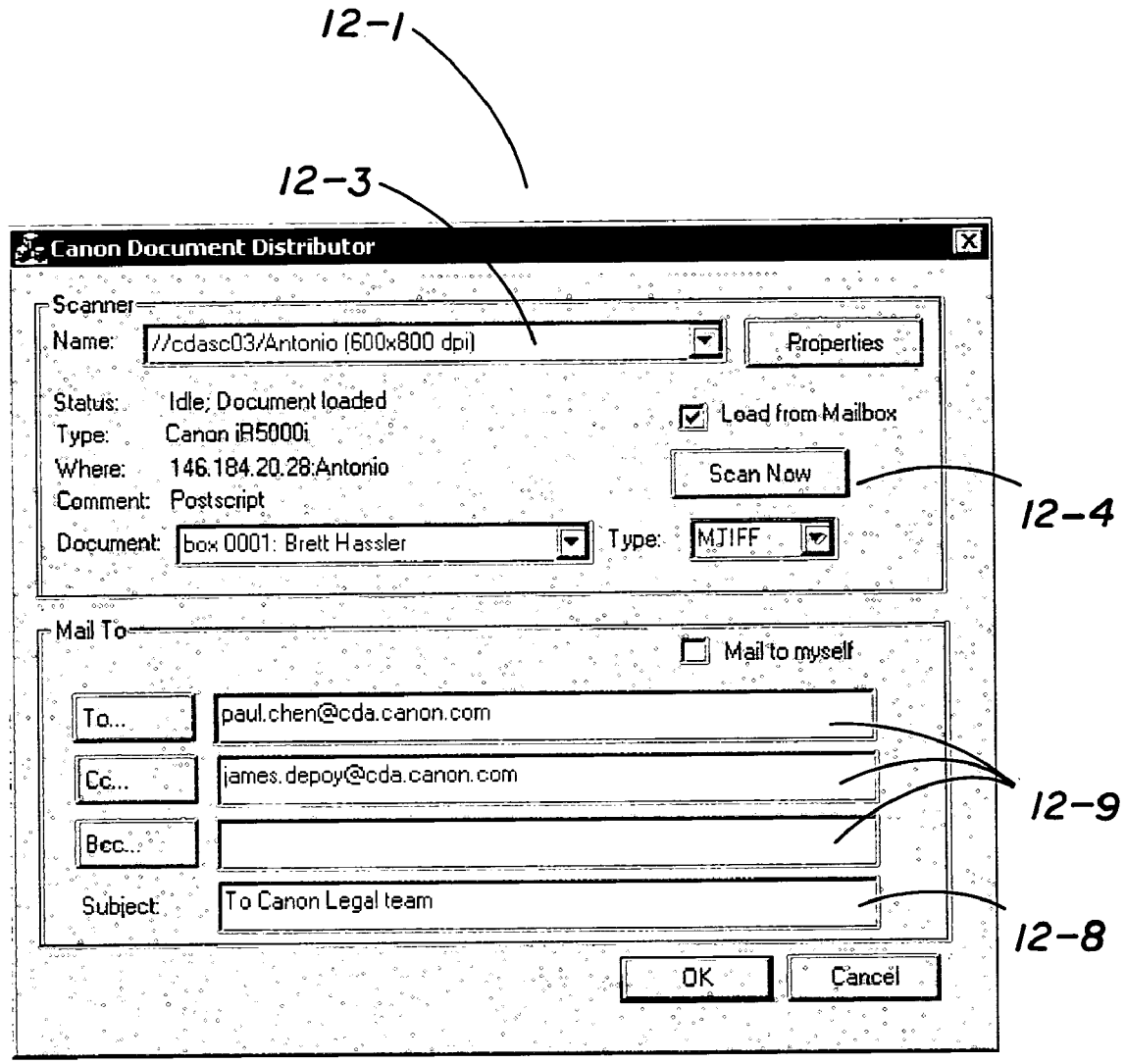
FIG. 12 depicts a user interface for scanning a document according to another embodiment of the present invention.

If, in step S10-16, "Mail to myself" field 11-7 is placed in the un-checked state, user interface 11-1 changes to user interface 12-1 of FIG. 12. User interface 12-1 is similar to user interface 11-1, except that "Recipients" field 12-9 becomes active. Per step S10-18, the user can enter multiple recipients in "Recipients" field 12-9. As in user interface 11-1, the user also verifies the digital copier in "Name" field 12-3 and provides a title for the scanned document in "Subject" field 12-8. Next in step S10-19, "Scan Now" button 12-4 is selected to initiate the scan operation.

Upon selection of "Scan Now" button 11-4, 12-4, in step S10-20 document distributor application 3 transmits client computer 2 authentication information to multiple mailbox application 10. Multiple mailbox application 10 in turn transmits the authentication information to the selected digital copier to authenticate the user on the selected digital copier. Following authentication of the user, the digital copier in step S10-21 performs the following: scans the document into the recipient's electronic mailbox on the digital copier where the scan operation occurred, provides an electronic copy of the scanned document to the recipients, and, via multiple mailbox application 10, provides a copy of the document to every one of user's electronic mailbox on every available digital copier. Multiple mailbox application 10 preferably performs the last function by locating, using the association between e-mail application electronic virtual mailboxes and digital copier electronic mailboxes, any other digital copiers where the user has an electronic mailbox, and transmitting a copy of the document to the user' electronic mailbox on the located digital copiers. If in step S10-22, the scanned document was stored in the guest account, then in step S10-23, the guest account is cleared. After clearing the guest account, or if in step S10-23 the scanned document was not stored in the guest account, the digital copier and document distributor application 3 are ready to receive new input (step S10-24).

Figure 13A:
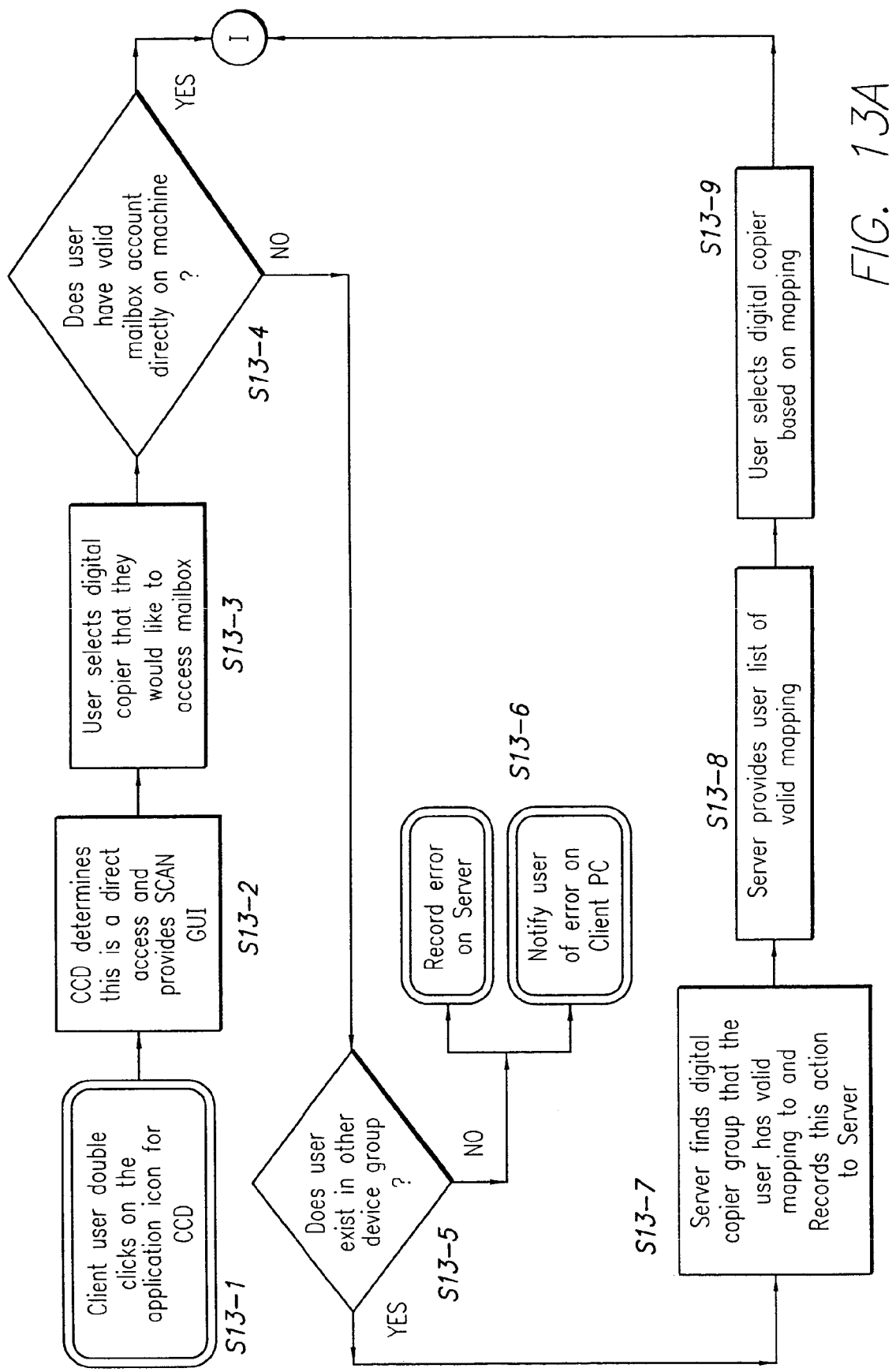
FIG. 13 is a flowchart describing transmitting a previously scanned document using the client application of the present invention.
Figure 13B:
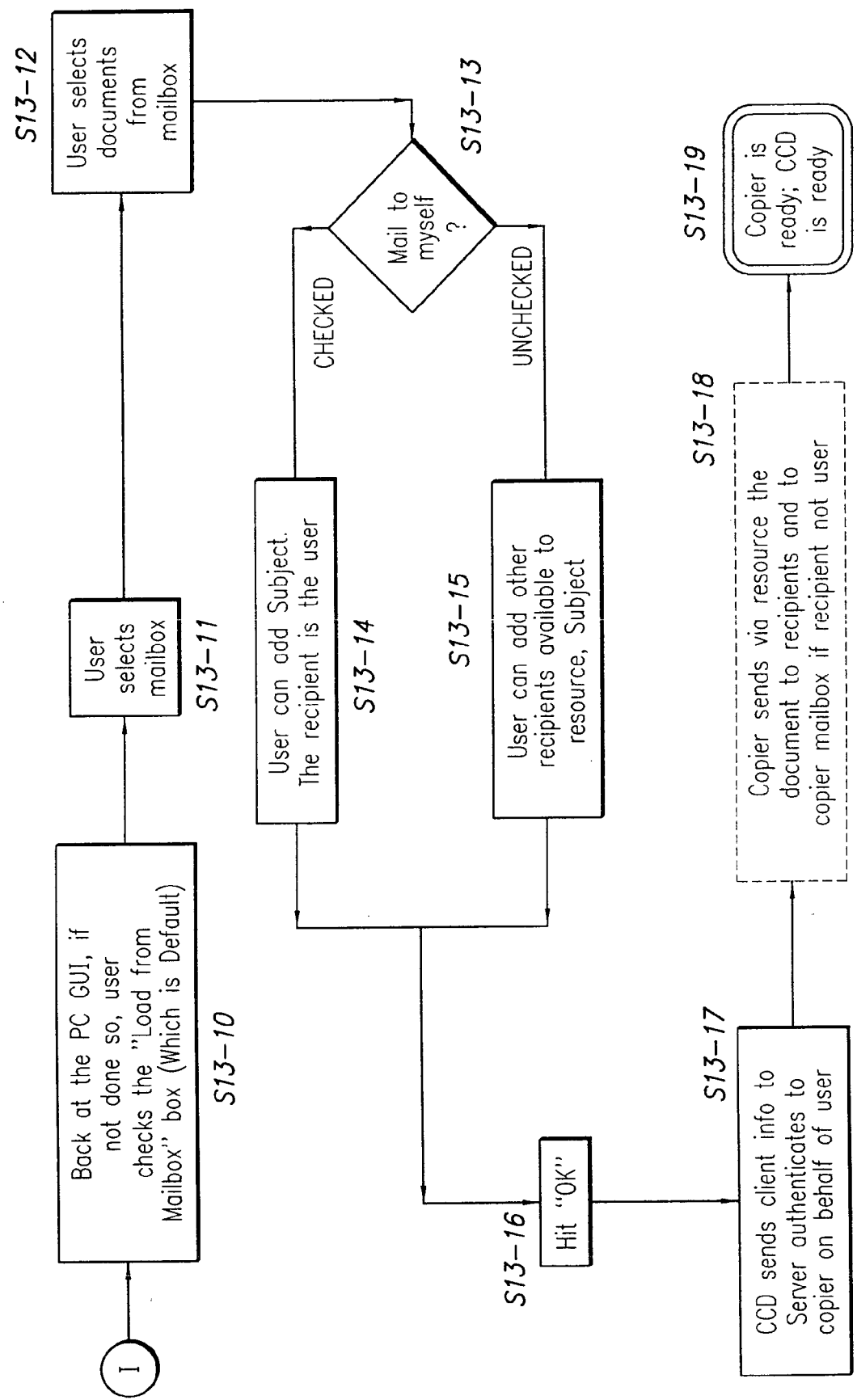

FIG. 13 is a flowchart describing transmitting a previously scanned document using document distributor application 3 of the present invention. Briefly, document distributor application 3 allows a user to access a previously scanned document from a digital copier's electronic mailbox and transmit an electronic copy of the document.

Figure 14:
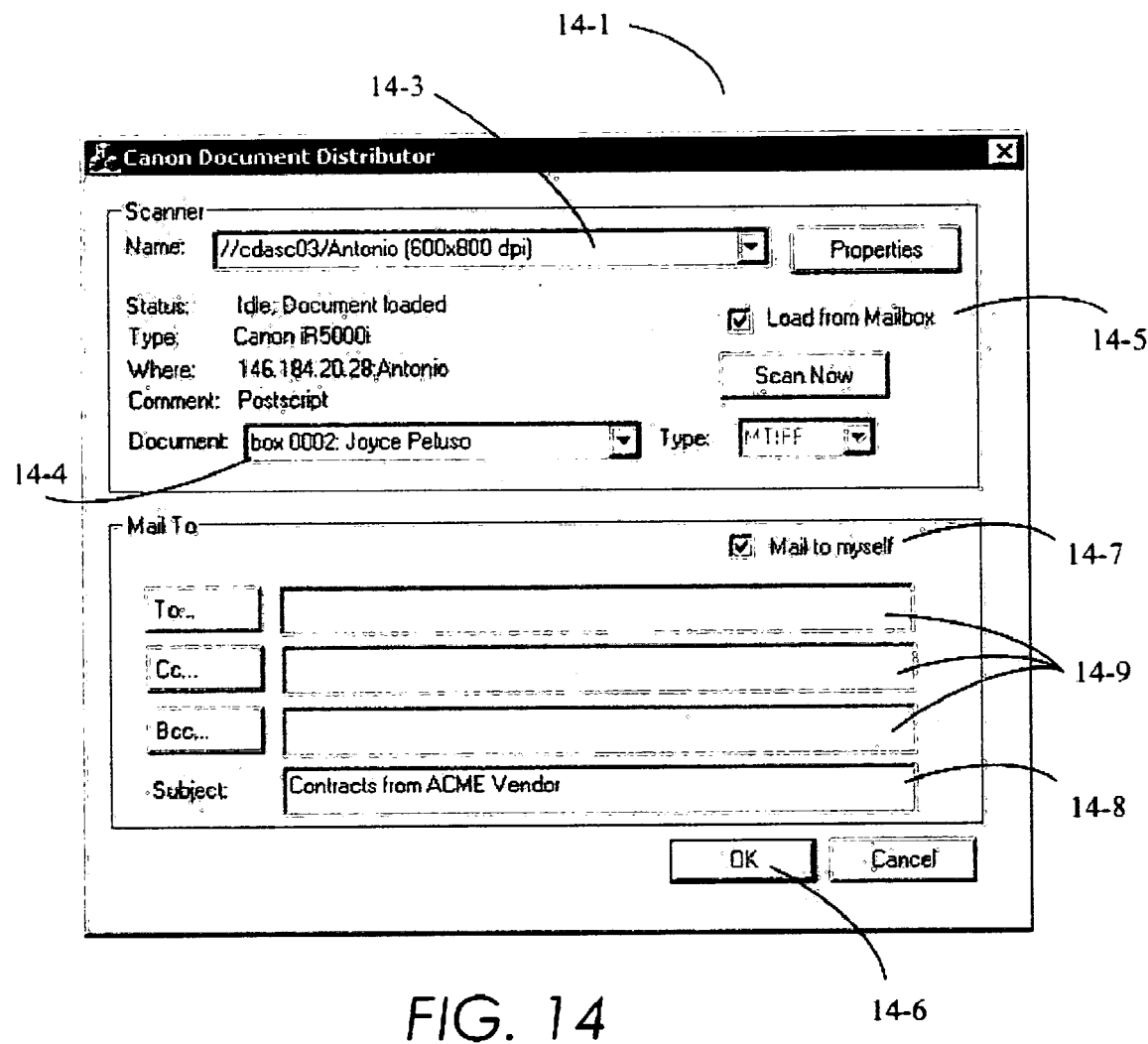
FIG. 14 depicts the user interface for transmitting a previously scanned document according to the present invention.

In step S13-1, a user initiates document distributor application 3 in the same manner as described above with respect to step S10-1. In step S13-2, document distributor application determines it was initiated outside of an application (i.e., Microsoft® Word), and provides user interface 14-1 as shown in FIG. 14. User interface 14-1 is identical in format to that of user interfaces 11-1 and 12-1.

Next, in step S13-3, the user selects the digital copier containing the electronic mailbox the user would like to access by filling in the digital copier name in "Name" field 14-3. The name can either by typed in or selected from a drop-down menu. After the digital copier is selected, in step S13-4, verification of whether the user has a valid mailbox on the selected digital copier is performed. If the verification fails, a check is performed in step S13-5 to determine whether the user has an electronic mailbox on a different digital copier. If the user does not, in step S13-6, an error is recorded on server 9 and an error notification is provided to client computer 2.

If the user has an electronic mailbox on a digital copier other than the selected digital copier, flow proceeds to step S13-7. Multiple mailbox application 10 locates any other digital copiers where the user has an electronic mailbox. This is accomplished by using the association between e-mail application electronic virtual mailboxes and digital copier electronic mailboxes described above. In step S13-8, multiple mailbox application 10 provides the user with a list of the digital copiers where the user has an electronic mailbox. Based on this list, the user selects a new digital copier in "Names" field 14-2.

Returning to step S13-4, if the user has an electronic mailbox on the digital copier that was selected in steps S13-3 or S13-9, flow proceeds to step S13-10. In step S13-10, if "Load to Mailbox" field 14-5 is not checked, then the user checks it. Then, in steps S13-11 and S13-12, the user selects the electronic mailbox and document in "Document" field 14-4.

Figure 15:
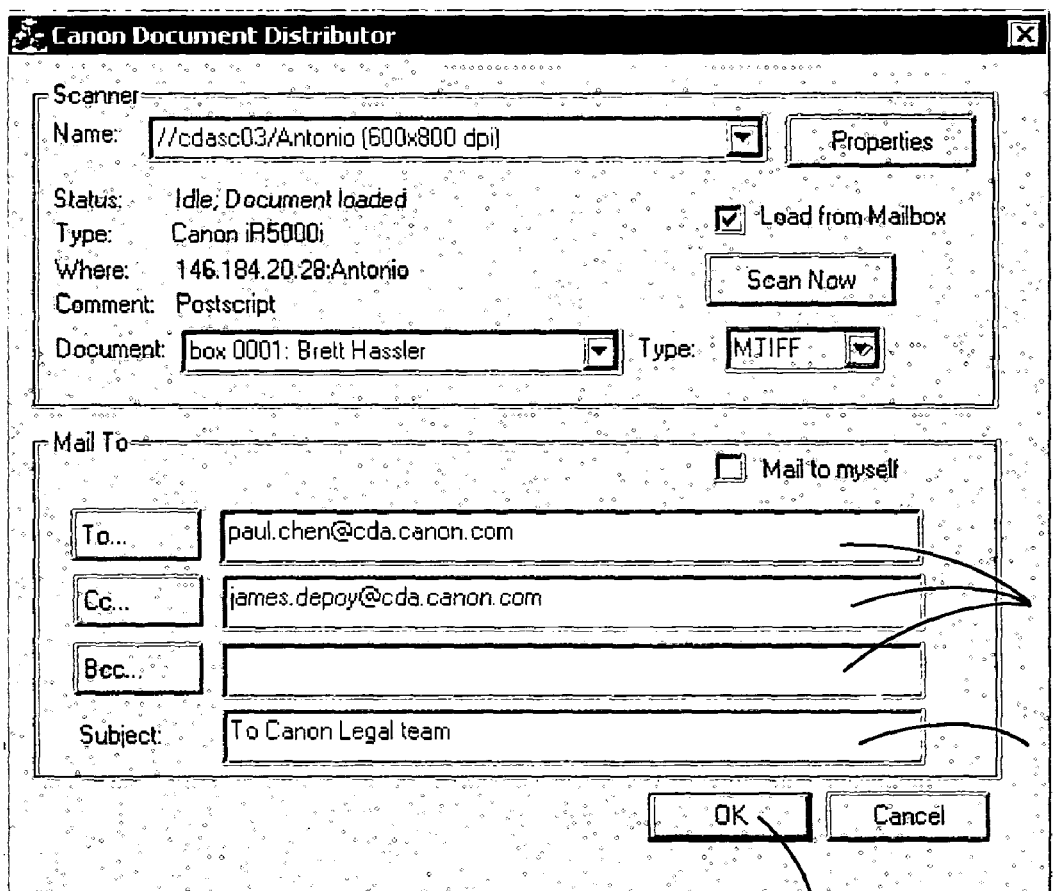
FIG. 15 depicts the user interface for transmitting a previously scanned document according to the present invention.

In step S13-13, "Mail to myself" field 14-7 is either checked or un-checked. If "Mail to myself" field 14-7 is checked, the user is the only recipient of the electronic document, and "Recipients" field 14-9 remains grayed-out. In step S13-14, the user need only provide a title for the document in "Subject" field 14-8. If "Mail to myself" field 14-7 is not checked, user interface 14-1 changes to user interface 15-1 of FIG. 15. User interface 15-1 is similar to user interface 14-1, except that "Recipients" field 15-2 becomes active. Per step S13-15, the user can enter multiple recipients in "Recipients" field 15-9. As in user interface 14-1, the user also provides a title for the electronic document in "Subject" field 15-8.

Following steps S13-14 or S13-15, in step S13-16, the user selects "OK" button 14-6, 15-4 to initiate the transmission operation. Upon selection of "OK" button, document distributor application 3 transmits client computer authentication information to multiple mailbox application 10 in step S13-16. Multiple mailbox application 10 in turn transmits the authentication information to the selected digital copier to authenticate the user on the digital copier. Following authentication of the user, in step S13-18, the digital copier provides an electronic copy of the electronic document as well as a "print-ready" copy to the recipients in "Recipients" field 15-9. In the case of FIG. 14, where the user is the only recipient, the digital copier only provides an electronic copy of the electronic document. Digital copier and document distributor application 3 are then ready to receive new input (step S13-18).

The above embodiment of the present invention includes e-mail application 6 for transmitting an electronic copy of an electronic document. In another embodiment, an FTP application can be substituted for e-mail application 6, where the FTP application would function to transmit an electronic copy of an electronic document. In this embodiment, the FTP application includes the same electronic address storage location feature as e-mail application 6. The nomenclature for the electronic address storage location in FTP application is different than that in e-mail application 6, but the functionality is the same. As such, in this embodiment, at least one FTP application electronic storage function is associated with at least one electronic mailbox residing on at least one printing apparatus.

In yet another embodiment, an NTFS application can be substituted for e-mail application 6, where the NTFS application would function to transmit an electronic copy of an electronic document. In this embodiment, the NTFS application includes the same electronic address storage location feature as e-mail application 6. The nomenclature for the electronic address storage location in NTFS application is different, but the functionality is the same. As such, in this embodiment, at least one NTFS application electronic storage location is associated with at least one electronic mailbox residing on at least one printing apparatus.

While the invention is described above with respect to what is currently its preferred embodiment, it is to be understood that the invention is not limited to that described above. To the contrary, the invention is intended to cover various modifications and equivalent arrangements within the spirit and scope of the appended claims.

What is claimed is:

1. A method for distributing electronic documents to at least one storage location of an electronic document transfer application and to at least one virtual storage location residing on at least one printing apparatus, the method comprising:
   mapping the at least one storage location of the electronic document transfer application to the at least one virtual storage location residing on the at least one printing apparatus,
   wherein the mapping is achieved by assigning an identical storage location identifier for both storage locations;
   recognizing the mapping of the at least one storage location of the electronic document transfer application to the at least one virtual storage location residing on the at least one printing apparatus;
   transmitting the electronic documents to the at least one storage location of the electronic document transfer application and the at least one virtual storage location residing on the at least one printing apparatus based on the recognized mapping;
   receiving the electronic documents at the at least one virtual storage location residing on the at least one printing apparatus; and
   storing the electronic documents received at the at least one virtual storage location on the at least one printing apparatus.

2. A method according to claim 1, wherein the electronic documents are rendered before transmission to the at least one printing apparatus.

3. A method according to claim 1, wherein each of the at least one printing apparatuses contain identical virtual storage locations.

4. A method according to claim 1, wherein the at least one printing apparatus includes a scanning function.

5. A method according to claim 4, wherein the client application functions to initiate a scanning operation on the at least one printing apparatus.

6. A method according to claim 5, wherein the results of the scanning operation are stored in at least one virtual storage location residing on the at least one printing apparatus.

7. A method according to claim 5, wherein the results of the scanning operation are transmitted to the electronic document transfer application.

8. A method according to claim 5, wherein the results of the scanning operation are transmitted to at least one printing apparatus different from the printing apparatus where the scanning operation occurred.

9. A method according to claim 1, further comprising retrieving an electronic document to be printed, at a printing apparatus, from a virtual storage location residing on a first printing apparatus.

10. A method according to claim 9, further comprising verifying the virtual storage location resides on the first printing apparatus.

11. A method according to claim 10, further comprising retrieving the electronic document from a second printing apparatus in the event the virtual storage location does not reside on the first printing apparatus, wherein the electronic document is transmitted from a second printing apparatus to the first printing apparatus.

12. A method according to claim 1, wherien the electronic document transfer application is an electronic message application, a file transfer protocol application, or a terminal file system application.

13. A system for distributing electronic documents to at least one storage location of an electronic document transfer application and to at least one virtual storage location residing on at least one printing apparatus, comprising:
   at least one server device that functions to map the at least one storage location of the electronic document transfer application to the at least one virtual storage location residing on the at least one printing apparatus,
   wherein the mapping is achieved by assigning an identical storage location identifier for both storage locations;
   at least one client application that functions to transmit the electronic documents;
   at least one server application, the server application functioning to receive the electronic documents from the client application;
   wherein the server application recognizes the mapping of the at least one storage location of the electronic document transfer application to the at least one virtual storage location residing on the at least one printing apparatus, and
   wherein the server application transmits the electronic documents to the at least one electronic mailbox residing on the at least one printing apparatus based on the mapping;
   at least one printing apparatus, the printing apparatus functioning to receive the electronic documents from the server application;
   wherein the printing apparatus stores the electronic documents in an electronic mailbox residing on the printing apparatus;
   at least one electronic document transfer application, the electronic document transfer application functioning to receive the electronic documents;
   wherein the electronic document transfer application receives the electronic documents from either the client application or the server application.

14. A system according to claim 13, wherein the electronic documents are rendered before transmission to the at least one printing apparatus.

15. A system according to claim 13, wherein each of the at least one printing apparatuses contain identical virtual storage locations.

16. A system according to claim 13, wherein the at least one printing apparatus includes a scanning function.

17. A system according to claim 16, wherein the client application functions to initiate a scanning operation on the at least one printing apparatus.

18. A system according to claim 16, wherein the results of the scanning operation are stored in at least one virtual storage location residing on the at least one printing apparatus.

19. A system according to claim 16, wherein the results of the scanning operation are transmitted to the electronic document transfer application.

20. A system according to claim 16, wherein the results of the scanning operation are transmitted to at least one printing apparatus different from the printing apparatus where the scanning operation occurred.

21. A system according to claim 13, further comprising computer-readable executable code means for retrieving an electronic document from virtual storage location residing on a first printing apparatus.

22. A system according to claim 21, further comprising a computer-executable code means for verifying the virtual storage location resides on the first printing apparatus.

23. A system according to claim 22, further comprising computer executable code means for retrieving the electronic document from a second printing apparatus in the event the mailbox virtual storage location does not reside on the first printing apparatus, wherein the electronic document is transmitted from the second printing apparatus to the first printing apparatus.

24. A system according to claim 13, wherein the electronic document transfer application is an electronic message application.

25. A system according to claim 13, wherein the electronic document transfer application is a file transfer protocol application.

26. A system according to claim 13, wherein the electronic document transfer application is a network terminal file system application.

27. A computer-readable storage medium, storing computer-executable process steps, the computer-executable process steps causing a computer to execute the method of claim 1.

* * * * *